US012446002B2

(12) United States Patent
Wu et al.

(10) Patent No.: US 12,446,002 B2
(45) Date of Patent: Oct. 14, 2025

(54) METHOD AND APPARATUS FOR PERFORMING PAGING IN A COMMUNICATION SYSTEM

(71) Applicant: Samsung Electronics Co., Ltd., Suwon-si (KR)

(72) Inventors: Min Wu, Beijing (CN); Feifei Sun, Beijing (CN)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 18/388,146

(22) Filed: Nov. 8, 2023

(65) Prior Publication Data
US 2024/0080802 A1 Mar. 7, 2024

Related U.S. Application Data

(63) Continuation of application No. 17/444,275, filed on Aug. 2, 2021, now Pat. No. 11,902,935.

(30) Foreign Application Priority Data

Aug. 4, 2020 (CN) .......................... 202010774107.7
Oct. 21, 2020 (CN) .......................... 202011135419.X

(51) Int. Cl.
*H04W 68/02* (2009.01)
*H04W 8/02* (2009.01)
*H04W 72/23* (2023.01)

(52) U.S. Cl.
CPC .............. *H04W 68/02* (2013.01); *H04W 8/02* (2013.01); *H04W 72/23* (2023.01)

(58) Field of Classification Search
CPC .... H04L 5/0053; H04L 5/0094; H04W 68/02; H04W 68/025; H04W 76/28; H04W 8/02;
(Continued)

(56) References Cited

U.S. PATENT DOCUMENTS 10,785,747 B2   9/2020  Kim et al.
10,904,861 B2   1/2021  Hwang et al.
(Continued)

FOREIGN PATENT DOCUMENTS

CN    111278107 A   6/2020
EP     4187998 A1   5/2023
(Continued)

OTHER PUBLICATIONS

International Search Report and Written Opinion of the International Searching Authority dated Nov. 10, 2021, in connection with International Application No. PCT/KR2021/010046, 9 pages.
(Continued)

*Primary Examiner* — Hirdepal Singh

(57) ABSTRACT

A communication method and system for converging a 5th-Generation (5G) communication system for supporting higher data rates beyond a 4th-Generation (4G) system with a technology for Internet of Things (IoT). The disclosure may be applied to intelligent services based on the 5G communication technology and the IoT-related technology, such as smart home, smart building, smart city, smart car, connected car, health care, digital education, smart retail, security and safety services. A method performed by a terminal comprises: receiving, from a base station, information indicating whether at least one paging message is to be transmitted in at least one paging occasion (PO) among a plurality of POs configured with the UE; identifying that the at least one paging message is to be transmitted in the at least one PO based on the information; and monitoring the at least one PO for receiving the at least one paging message.

12 Claims, 35 Drawing Sheets

(58) Field of Classification Search
CPC . H04W 24/08; H04W 52/0209; H04W 68/00; H04W 68/005; H04W 72/23; H04W 72/232
USPC .......................................................... 455/458
See application file for complete search history.

(56) References Cited

U.S. PATENT DOCUMENTS

| | | | |
|---|---|---|---|
| 11,019,598 | B1 | 5/2021 | Liu |
| 11,290,981 | B2 | 3/2022 | Berggren et al. |
| 11,956,754 | B2 | 4/2024 | Hwang et al. |
| 2017/0311316 | A1* | 10/2017 | Chendamarai Kannan ................. H04W 72/0446 |
| 2019/0230628 | A1 | 7/2019 | Chen et al. |
| 2019/0349856 | A1 | 11/2019 | Liu et al. |
| 2020/0107267 | A1 | 4/2020 | Wu et al. |
| 2020/0245246 | A1 | 7/2020 | Dhanda et al. |
| 2020/0329454 | A1 | 10/2020 | Tang |
| 2021/0127414 | A1 | 4/2021 | Abdoli et al. |
| 2021/0385792 | A1* | 12/2021 | Nam ................ H04W 68/02 |
| 2022/0046542 | A1* | 2/2022 | Hwang ............. H04B 7/0613 |
| 2022/0279479 | A1* | 9/2022 | Nader .............. H04W 52/0216 |
| 2023/0108646 | A1* | 4/2023 | Tseng ............... H04W 68/025 455/458 |
| 2023/0209464 | A1* | 6/2023 | Tsai ................ H04W 52/0216 370/311 |

FOREIGN PATENT DOCUMENTS

| | | |
|---|---|---|
| JP | 2020501431 A | 1/2020 |
| JP | 2020510381 A | 4/2020 |
| JP | 2021502029 A | 1/2021 |
| KR | 10-2015-0105602 A | 9/2015 |
| WO | 2018175760 A1 | 9/2018 |
| WO | 2019086674 A1 | 5/2019 |
| WO | 2019127483 A1 | 7/2019 |
| WO | 2019160496 A1 | 8/2019 |
| WO | 2020032717 A1 | 2/2020 |
| WO | 2020032739 A1 | 2/2020 |
| WO | 2020061933 A1 | 4/2020 |
| WO | 2022007876 A1 | 1/2022 |

OTHER PUBLICATIONS

Zte, "Views on power saving enhancement," R1-2003489, 3GPP TSG RAN WG1 #101, e-Meeting, May 25-Jun. 5, 2020, 11 pages.
Supplementary European Search Report dated Oct. 4, 2023, in connection with European Application No. 21854547.3, 14 pages.
Ericsson, "Wake-up signal configurations and procedures for NB-IoT," R1-1719356, 3GPP TSG-RAN WG1 Meeting #91, Reno, USA, Nov. 27-Dec. 1, 2017, 6 pages.
Notification to Grant Patent Right for Invention dated Jun. 3, 2024, in connection with Chinese Application No. 202011135419.X, 7 pages.
Office Action dated May 29, 2024, in connection with Korean Application No. 10-2022-7034015, 12 pages.
Notice of Allowance dated Jun. 4, 2024, in connection with Japanese Application No. 2022-278872, 7 pages.
Li, et al., "Research and Implementation of Idle State of eDRX in eMTC Terminal," Study on Optical Communications, Issue 2, 2013, 8 pages.
Li, et al., "Power Saving Techniques for 5G and Beyond," IEEE Access, Dec. 2019, 15 pages.
Ericsson, "Remaining issues on paging," R2-2000336 Revision of R2-1914647, 3GPP TSG-RAN WG2 Meeting #109-e, Electronic meeting, Feb. 24-Mar. 6, 2020, 7 pages.
Vivo, "Short message for stopping paging monitoring," R2-2000151, 3GPP TSG-RAN WG2 Meeting #109-e, Electronic meeting, Feb. 24-Mar. 6, 2020, 2 pages.

* cited by examiner

FIG. 29

TRANSMIT INDICATION INFORMATION TO THE USER EQUIPMENT, WHERE THE
INDICATION INFORMATION IS USED TO INDICATE WHETHER THERE IS A PAGING ~S510
MESSAGE TRANSMISSION ON M PAGING OCCASIONS (POs)

METHOD AND APPARATUS FOR PERFORMING PAGING IN A COMMUNICATION SYSTEM

CROSS-REFERENCE TO RELATED APPLICATIONS

This application is a continuation of application Ser. No. 17/444,275, filed Aug. 2, 2021, based on and claims priority under 35 U.S.C. 119(a) of a Chinese patent application number 202010774107.7 filed on Aug. 4, 2020, in the China National Intellectual Property Administration, and of a Chinese patent application number 202011135419.X, filed on Oct. 21, 2020, in the China National Intellectual Property Administration, the disclosure of each of which is incorporated by reference herein in its entirety.

BACKGROUND

1. Field

The disclosure relates to the technical field of wireless communication, and particularly to a method performed by a user equipment, a method performed by a base station, a terminal and a base station. The disclosure relates to a method and an apparatus for performing paging in a communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

SUMMARY

In line with the development of the communication systems, there is a need for a method performed by a user equipment (UE), a base station, or a UE and a base station in order to transmit and receive data more efficiently. Also, there is need for a method and an apparatus for performing paging.

According to an aspect of the disclosure, there is provided a method performed by the user equipment (UE) comprising the following steps: receiving indication information, wherein the indication information is used to indicate whether there is a paging message to be transmitted on M paging occasions (POs) in one paging cycle, and M>1; and determining whether to monitor a corresponding PO in the M POs based on the received indication information.

According to an aspect of the disclosure, there is provided a method performed by a base station comprising: transmitting indication information to a user equipment (UE), wherein the indication information is used to indicate whether there is a paging message to be transmitted on M paging occasions (POs) in one paging cycle, and M>1.

According to another aspect of the disclosure, there is provided a terminal, the terminal comprising: a transceiver configured to transmit and receive signals with the outside; and a processor configured to control the transceiver to perform a method according to any one of the above methods performed by the terminal.

According to another aspect of the disclosure, there is provided a base station comprising a transceiver configured to transmit and receive signals with the outside; and a processor configured to control the transceiver to perform a method according to any one of the methods performed by the above base station.

According to another aspect of the disclosure, there is provided a non-transitory computer-readable recording medium having stored thereon a program, which when performed by a computer, performs any one of the methods described above.

According to another aspect of the disclosure, there is provided a method performed by a user equipment (UE) in a communication system. The method comprising: receiving, from a base station, information indicating whether at least one paging message is to be transmitted in at least one paging occasion (PO) among a plurality of POs configured with the UE; identifying that the at least one paging message is to be transmitted in the at least one PO based on the information; and monitoring the at least one PO for receiving the at least one paging message.

According to another aspect of the disclosure, there is provided a method performed by a base station in a communication system. The method comprising: transmitting, to a UE, information indicating whether at least one paging message is to be transmitted in at least one paging occasion (PO) among a plurality of POs configured with a user equipment (UE); and transmitting, to the UE, the at least one paging message in the at least one PO based on the information, wherein the information is used to identify whether to monitor the at least one PO for receiving the at least one paging message.

According to another aspect of the disclosure, there is provided a user equipment (UE) in a communication system. The UE comprising: a transceiver; and a controller configured to: receive, from a base station via the transceiver, information indicating whether at least one paging message is to be transmitted in at least one paging occasion (PO) among a plurality of POs configured with the UE, identify that the at least one paging message is to be transmitted in the at least one PO based on the information, and monitor the at least one PO for receiving the at least one paging message.

According to another aspect of the disclosure, there is provided a method performed by a base station in a communication system. The base station comprising: a transceiver; and a controller configured to: transmit, to a user equipment (UE) via the transceiver, information indicating whether at least one paging message is to be transmitted in at least one paging occasion (PO) among a plurality of POs configured with the UE, and transmitting, to the UE via the transceiver, the at least one paging message in the at least one PO based on the information, wherein the information is used to identify whether to monitor the at least one PO for receiving the at least one paging message.

According to the embodiments of the disclosure, a method performed by a user equipment (UE), a base station, or a UE and a base station is provided, so that the UE and base station transmit and receive data more efficiently.

According to the embodiment of the disclosure, a method and an apparatus for performing paging are provided, so that the UE does not need to monitor the specific paging occasion (PO), and therefore further reducing the power consumption of the UE.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 29 illustrates a flowchart of a method performed by a base station according to an embodiment of the disclosure;

DETAILED DESCRIPTION

Figure 1:
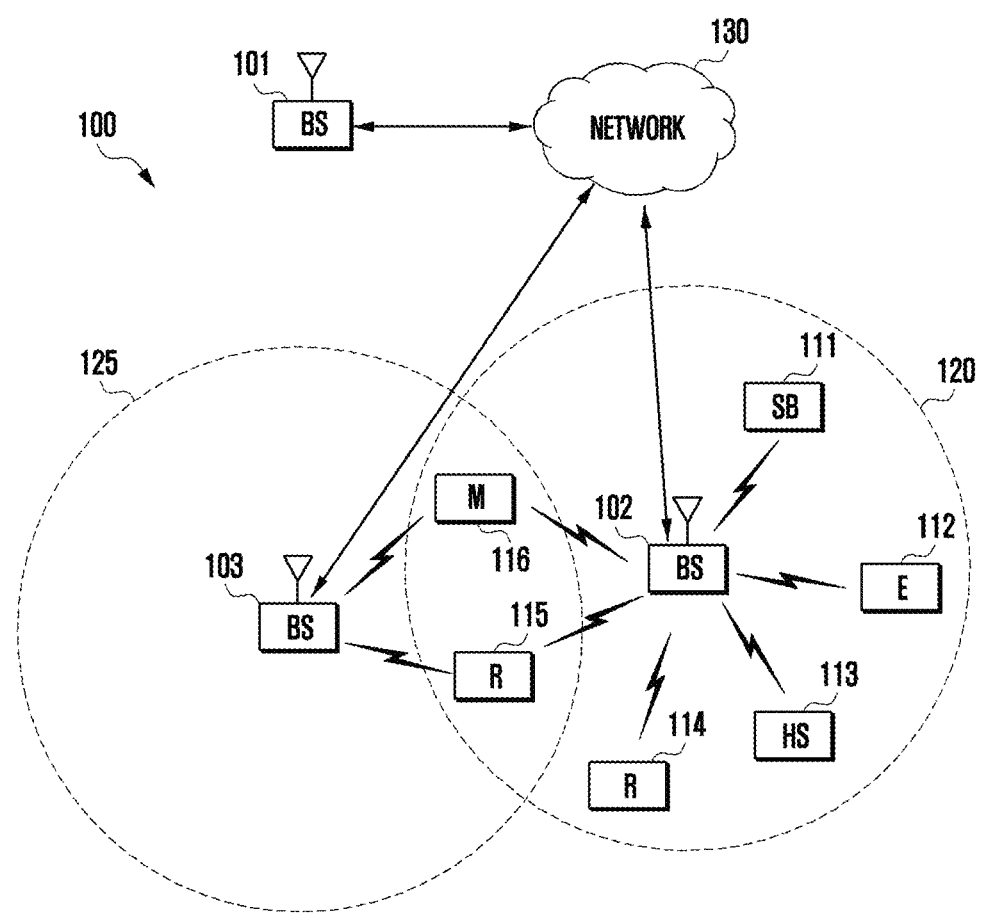
FIG. 1 illustrates an exemplary wireless network according to various embodiments of the disclosure.

FIGS. 1 through 31, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

FIGS. 1-31, discussed below, and the various embodiments used to describe the principles of the disclosure in this patent document are by way of illustration only and should not be construed in any way to limit the scope of the disclosure. Those skilled in the art will understand that the principles of the disclosure may be implemented in any suitably arranged system or device.

FIG. 1 illustrates an exemplary wireless network 100 according to various embodiments of the disclosure. The embodiment of the wireless network 100 shown in FIG. 1 is for illustration only. Other embodiments of the wireless network 100 can be used without departing from the scope of this disclosure.

The wireless network 100 includes a gNodeB (gNB) 101, a gNB 102 and a gNB 103. gNB 101 communicates with gNB 102 and gNB 103. gNB 101 also communicates with at least one Internet protocol (IP) network 130, such as the Internet, a proprietary IP network, or other data networks.

Other well-known terms such as "base station" or "access point" can be used instead of "gNB" depending on the network type. For convenience, the terms "gNodeB" and "gNB" are used in this patent document to refer to network infrastructure components that provide wireless access to remote terminals. And, other well-known terms such as "mobile station", "user station", "remote terminal", "wireless terminal" or "user device" can be used instead of "user equipment", depending on the network type. For convenience, the terms "user equipment" and "UE" are used in this patent document to refer to remote wireless apparatuses that wirelessly access gNB, whether the UE is a mobile device (such as a mobile phone or a smart phone) or is normally considered a stationary device (such as a desktop computer or vending machine).

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, long Term Evolution (LTE), LTE-A, WiMAX, or other wireless communication techniques.

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As will be described in more detail below, one or more of the gNB 101, the gNB 102, and the gNB 103 includes a 2D antenna array as described in embodiments of the disclosure. In some embodiments, one or more of gNB 101, gNB 102, and gNB 103 support codebook design and structure for systems with 2D antenna arrays.

Although FIG. 1 shows an example of a wireless network 100, various changes can be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

Figure 2A:
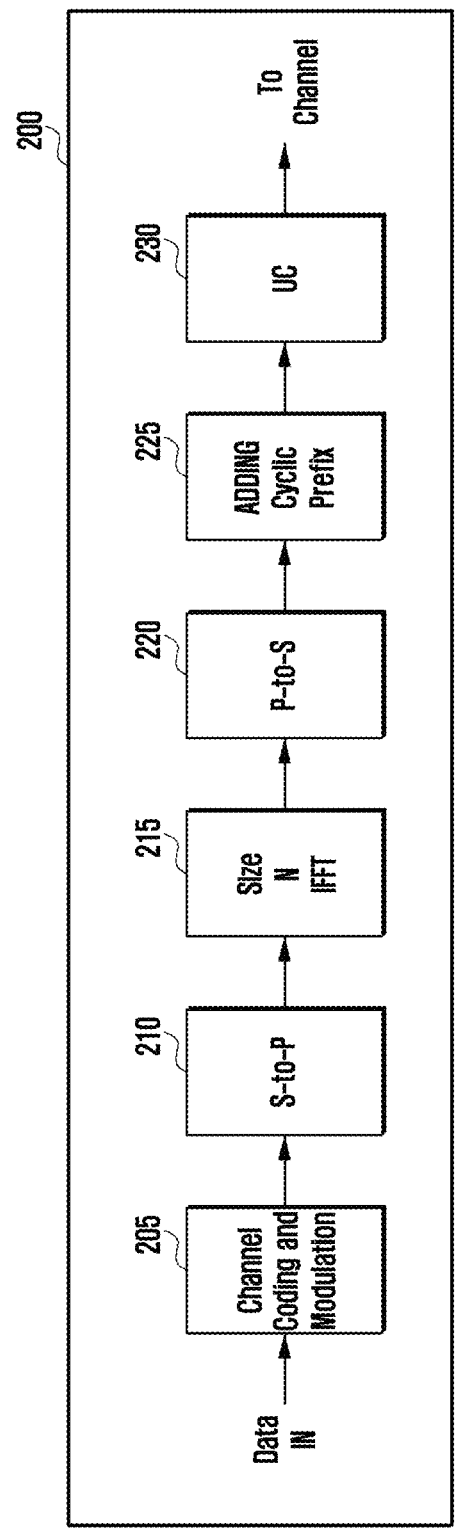
FIG. 2A illustrates an example wireless transmission path according to the disclosure.
Figure 2B:
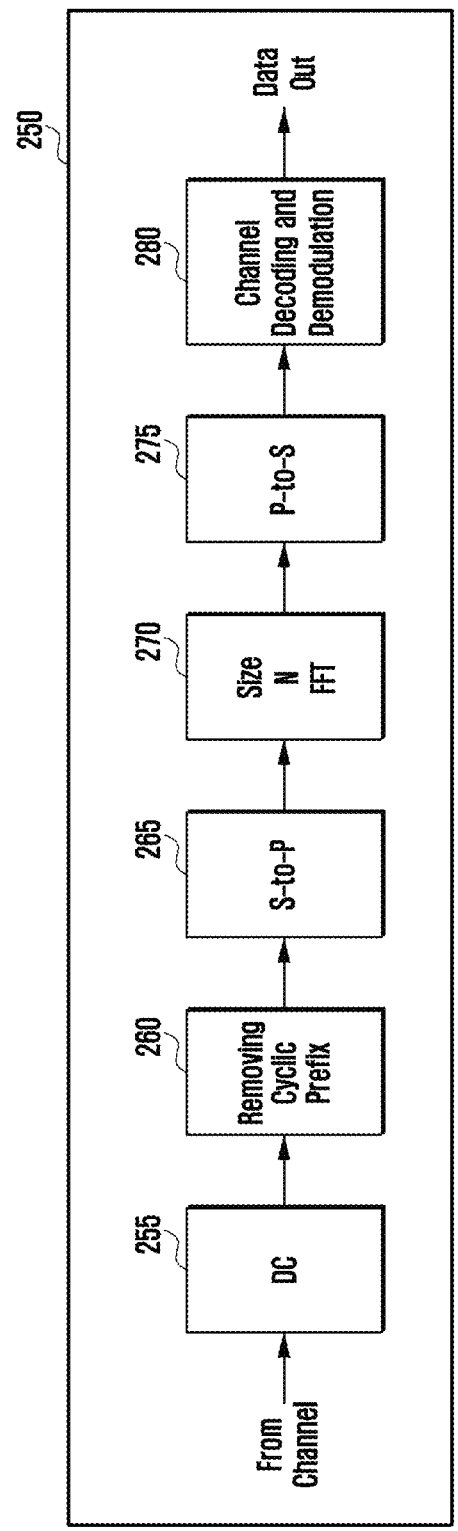
FIG. 2B illustrates an example wireless reception path according to the disclosure.

FIGS. 2A and 2B illustrate example wireless transmission and reception paths according to the disclosure. In the following description, the transmission path 200 can be described as being implemented in a gNB, such as the gNB 102, and the reception path 250 can be described as being implemented in a UE, such as the UE 116. However, it should be understood that the reception path 250 can be implemented in the gNB and the transmission path 200 can be implemented in the UE. In some embodiments, the reception path 250 is configured to support codebook design and structure for systems with 2D antenna arrays as described in embodiments of the disclosure.

The transmission path 200 includes a channel coding and modulation block 205, a serial to parallel (S to P) block 210, a size N inverse fast Fourier transform (IFFT) block 215, a parallel to serial (P to S) block 220, an adding cyclic prefix block 225, and an up-converter (UC)230. The reception path 250 includes a down converter (DC)255, a removing cyclic prefix block 260, a serial to parallel (S to P) block 265, a size N fast Fourier transform (FFT) block 270, a parallel to serial (P to S) block 275, and a channel decoding and demodulation block 280.

In the transmission path 200, the channel coding and modulation block 205 receives a set of information bits, applies coding (such as low density parity check (LDPC) coding), and modulates input bits (such as using quadrature phase shift keying (QPSK) or quadrature amplitude modulation (QAM)) to generate a sequence of frequency domain modulation symbols. Serial-to-parallel (S-to-P) block 210 converts (such as demultiplexes) the serial modulation symbols into parallel data to generate N parallel symbol streams, where N is the IFFT/FFT size used in gNB 102 and UE 116. The size N IFFT block 215 performs IFFT operations on the N parallel symbol streams to generate a time domain output signal. Parallel-to-serial block 220 converts (such as multiplexes) the parallel time domain output symbols from the size N IFFT block 215 to generate a serial time domain signal. The adding cyclic prefix block 225 inserts a cyclic prefix into the time domain signal. The upconverter 230 modulates (such as upconverts) the output of the adding cyclic prefix block 225 to an RF frequency for transmission via a wireless channel. It is also possible to filter the signal at baseband before frequency conversion to RF frequency.

The RF signal transmitted from the gNB 102 arrives at the UE 116 after passing through the wireless channel, and operations opposite to that at the gNB 102 are performed at the UE 116. The downconverter 255 downconverts the received signal to a baseband frequency, and the removing cyclic prefix block 260 removes the cyclic prefix to generate a serial time domain baseband signal. The serial-to-parallel block 265 converts the time domain baseband signal into a parallel time domain signal. The size N FFT block 270 performs an FFT algorithm to generate N parallel frequency domain signals. The parallel-to-serial block 275 converts the parallel frequency domain signal into a sequence of modulated data symbols. The channel decoding and demodulation block 280 demodulates and decodes the modulated symbols to recover the original input data stream.

Each of the gNB 101-103 may implement a transmission path 200 similar to transmitting to the UE 111-116 in the downlink, and may implement a reception path 250 similar to receiving from the UE 111-116 in the uplink. Similarly, each of the UE 111-116 may implement a transmission path 200 for transmitting to the gNB 101-103 in the uplink and a reception path 250 for receiving from the gNB 101-103 in the downlink.

Each of the components in FIGS. 2A and 2B can be implemented using only hardware, or using a combination of hardware and software/firmware. As a specific example, at least some of the components in FIGS. 2A and 2B may be implemented in software, while other components may be implemented by configurable hardware or a mixture of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the disclosure. Other types of transforms can be used, such as discrete Fourier transform (DFT) and inverse discrete Fourier transform (IDFT) functions. It should be understood that for DFT and IDFT functions, the value of variable N can be any integer (such as 1, 2, 3, 4, etc.), while for FFT and IFFT functions, the value of variable N can be any integer as a power of 2 (such as 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B can be combined, further subdivided or omitted, and additional components can be added according to specific needs. Furthermore, FIGS. 2A and 2B are intended to illustrate examples of types of transmission and reception paths that can be used in a wireless network. Any other suitable architecture can be used to support wireless communication in a wireless network.

Figure 3A:
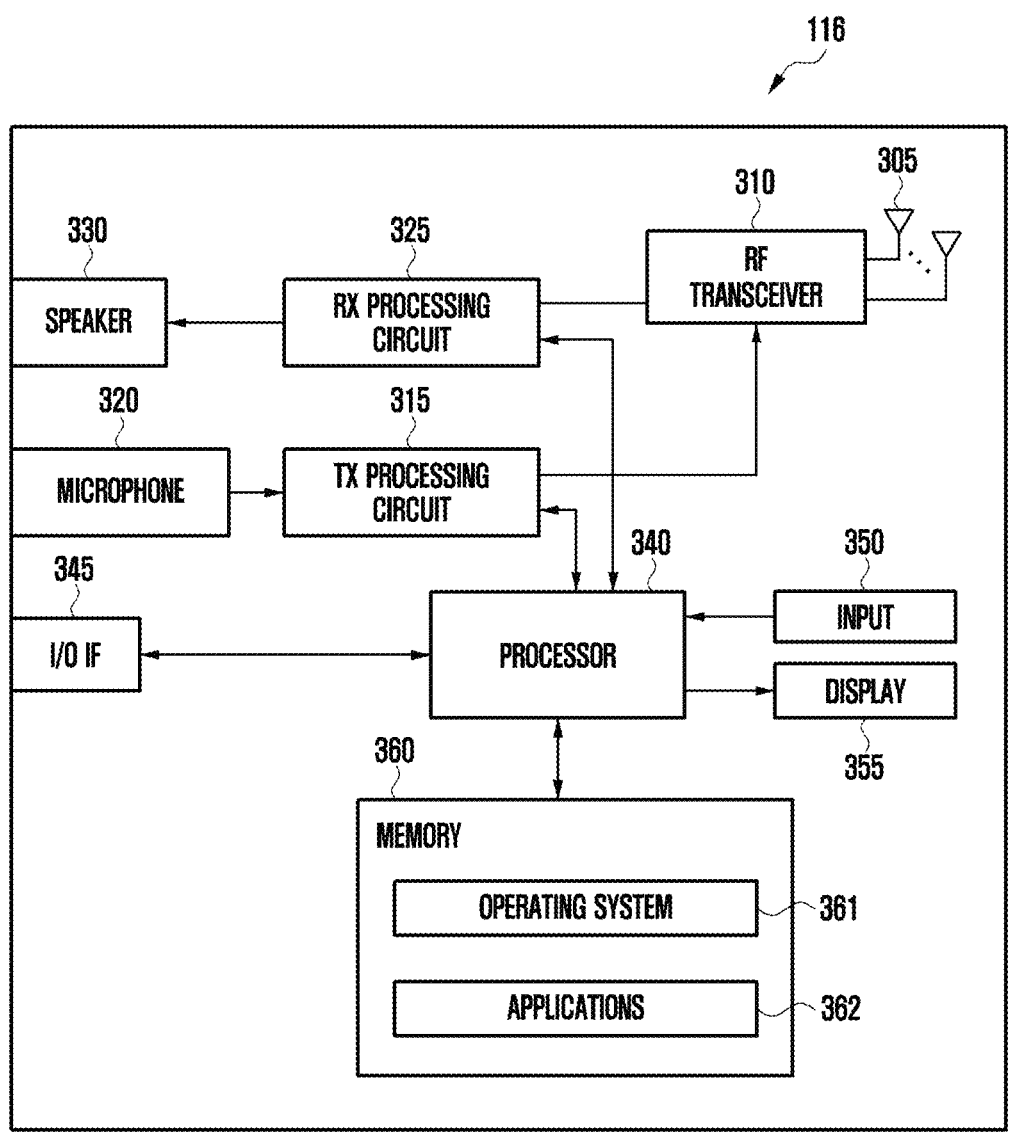
FIG. 3A illustrates an exemplary user equipment (UE) according to the disclosure.

FIG. 3A illustrates an exemplary UE 116 according to the disclosure. The embodiment of the UE 116 shown in FIG. 3A is for illustration only, and the UE 111-115 of FIG. 1 can have the same or similar configuration. However, the UE comes into a variety of configurations, and FIG. 3A does not limit the scope of the disclosure to any specific implementation of the UE.

The UE 116 includes an antenna 305, a radio frequency (RF) transceiver 310, a transmit (TX) processing circuit 315, a microphone 320, and a receive (RX) processing circuit 325. The UE 116 also includes a speaker 330, a processor/controller 340, an input/output (I/O) interface 345, an input device (s) 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is transmitted to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor/controller 340 for further processing (such as for web browsing data).

The TX processing circuitry 315 receives analog or digital voice data from the microphone 320 or other outgoing baseband data (such as web data, e-mail, or interactive video game data) from the processor/controller 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor/controller 340 can include one or more processors or other processing devices and execute the OS 361 stored in the memory 360 in order to control the overall operation of the UE 116. For example, the processor/controller 340 could control the reception of forward channel signals and the transmission of reverse channel signals by the RF transceiver 310, the RX processing circuitry 325, and the TX processing circuitry 315 in accordance with well-known principles. In some embodiments, the processor/controller 340 includes at least one microprocessor or microcontroller.

The processor/controller 340 is also capable of executing other processes and programs resident in the memory 360, such as operations for channel quality measurement and reporting of systems with 2D antenna arrays as described in embodiments of the disclosure. The processor/controller 340 can move data into or out of the memory 360 as required by an executing process. In some embodiments, the processor/controller 340 is configured to execute the applications 362 based on the OS 361 or in response to signals received from gNBs or an operator. The processor/controller 340 is also coupled to the I/O interface 345, which provides the UE 116 with the ability to connect to other devices, such as laptop computers and handheld computers. The I/O interface 345 is the communication path between these accessories and the processor 340.

The processor/controller 340 is also coupled to the input device (s) 350 and display 355. The operator of the UE 116 can use the input device (s) 350 to enter data into the UE 116. The display 355 may be a liquid crystal display, or other display capable of rendering text and/or at least limited graphics, such as from web sites. The memory 360 is coupled to the processor/controller 340. Part of the memory 360 could include a random access memory (RAM), and another part of the memory 360 could include a Flash memory or other read-only memory (ROM).

Although FIG. 3A shows one example of the UE 116, various changes can be made to FIG. 3A. For example, various components in FIG. 3 could be combined, further subdivided, or omitted and additional components could be added according to particular needs. As a particular example, the processor/controller 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 3B:
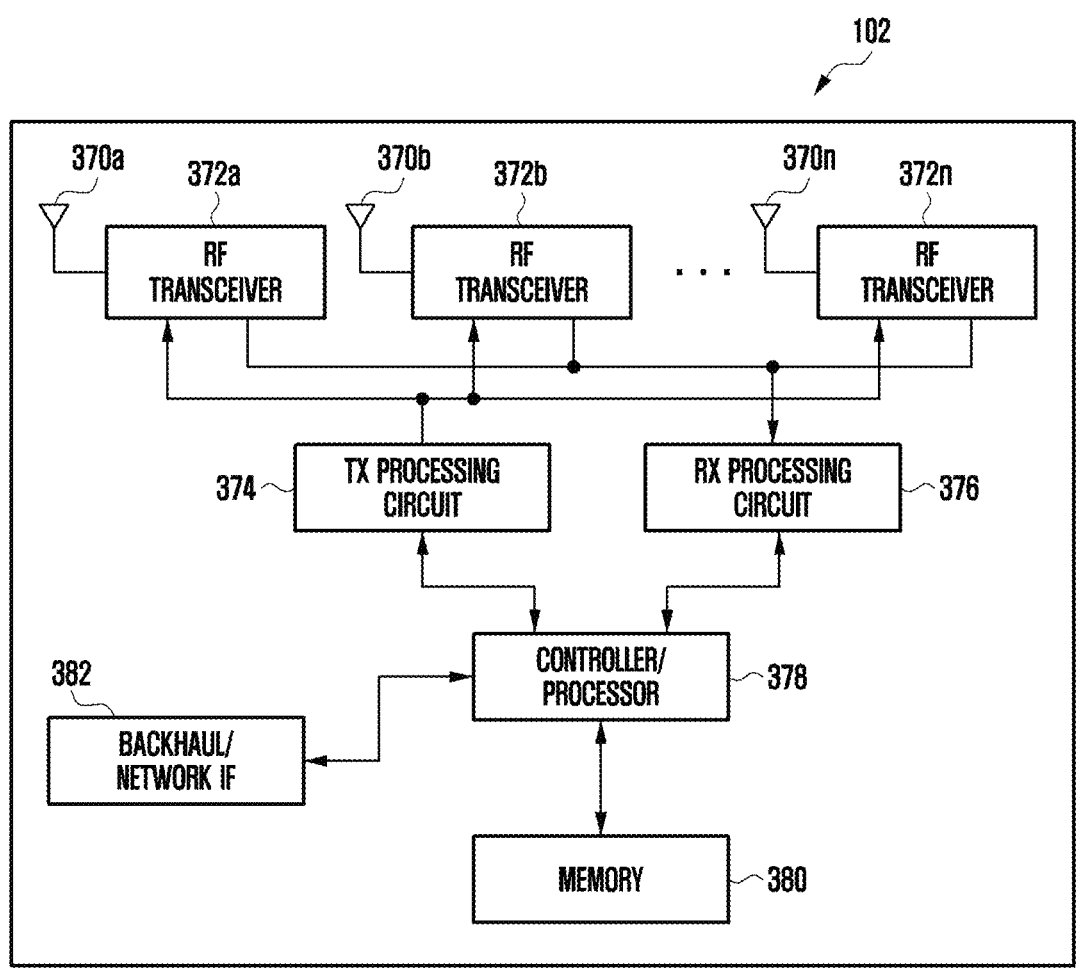
FIG. 3B illustrates an example base station gNB according to the disclosure.

FIG. 3B shows an example gNB 102 according to the disclosure. The embodiment of the gNB 102 shown in FIG. 3B is for illustration only, and other gNBs of FIG. 1 can have the same or similar configuration. However, gNBs come into a variety of configurations, and FIG. 3B does not limit the scope of the disclosure to any specific implementation of the gNBs. It should be noted that gNB 101 and gNB 103 can include the same or similar structures as gNB 102.

As shown in FIG. 3B, the gNB 102 includes a plurality of antennas 370a-370n, a plurality of RF transceivers 372a-372n, a transmit (TX) processing circuit 374, and a receive (RX) processing circuit 376. In certain embodiments, one or more of the plurality of antennas 370a-370n includes a 2D antenna array. gNB 102 also includes a controller/processor 378, a memory 380, and a backhaul or network interface 382.

RF transceivers 372a-372n receive incoming RF signals from antennas 370a-370n, such as signals transmitted by UEs or other gNBs. RF transceivers 372a-372n downconvert the incoming RF signals to generate IF or baseband signals. The IF or baseband signal is transmitted to the RX processing circuit 376, which generates a processed baseband signal by filtering, decoding and/or digitizing the baseband or IF signal. RX processing circuit 376 transmits the processed baseband signal to the controller/processor 378 for further processing.

TX processing circuit 374 receives analog or digital data (such as voice data, network data, email or interactive video game data) from the controller/processor 378. TX processing circuit 374 encodes, multiplexes and/or digitizes the outgoing baseband data to generate a processed baseband or IF signal. RF transceivers 372a-372n receive outgoing processed baseband or IF signals from the TX processing circuit 374 and up-convert the baseband or IF signals into RF signals for transmitting via antennas 370a-370n.

The controller/processor 378 can include one or more processors or other processing devices that control the overall operation of the gNB 102. For example, the controller/processor 378 can control the reception of forward channel signals and the transmission of reverse channel signals by the RF transceivers 372a-372n, the RX processing circuitry 376, and the TX processing circuitry 374 in accordance with well-known principles. The controller/processor 378 can also support additional functions, such as higher-level wireless communication functions. For example, the controller/processor 378 can perform a blind interference sensing (BIS) process performed such as by a BIS algorithm, and decode the received signal from which the interference signal is subtracted. A controller/processor 378 may support any of a variety of other functions in the gNB 102. In some embodiments, the controller/processor 378 includes at least one microprocessor or microcontroller.

Controller/processor 378 is also capable of executing programs and other processes resident in memory 380, such as a basic OS. The controller/processor 378 can also support channel quality measurement and reporting for systems with 2D antenna arrays as described in embodiments of the disclosure. In some embodiments, the controller/processor 378 supports communication between entities such as web RTC. The controller/processor 378 can move data into or out of the memory 380 as required by the execution process.

The controller/processor 378 is also coupled to a backhaul or network interface 382. Backhaul or network interface 382 allows gNB 102 to communicate with other devices or systems through a backhaul connection or through a network. Backhaul or network interface 382 can support communication over any suitable wired or wireless connection(s). For example, when the gNB 102 is implemented as a part of a cellular communication system, such as a cellular communication system supporting 5G or new radio access technology or NR, LTE or LTE-A, the backhaul or network interface 382 can allow the gNB 102 to communicate with other gNBs through wired or wireless backhaul connections. When the gNB 102 is implemented as an access point, the backhaul or network interface 382 can allow the gNB 102 to communicate with a larger network, such as the Internet, through a wired or wireless local area network or through a wired or wireless connection. Backhaul or network interface 382 includes any suitable structure that supports communication over a wired or wireless connection, such as an Ethernet or RF transceiver.

The memory 380 is coupled to the controller/processor 378. Part of the memory 380 can include RAM, while another part of the memory 380 can include flash memory or other ROM. In certain embodiments, a plurality of instructions, such as BIS algorithm, are stored in memory. The plurality of instructions are configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372a-372n, TX processing circuit 374 and/or RX processing circuit 376) support aggregated communication with FDD cells and TDD cells.

Although FIG. 3B shows an example of the gNB 102, various changes may be made to FIG. 3B. For example, the gNB 102 can include any number of each component shown in FIG. 3A. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, the gNB 102 can include multiple instances of each (such as one per RF transceiver).

Exemplary embodiments of the disclosure are further described below with reference to the accompanying drawings.

The text and drawings are provided as examples only to help the readers understand the disclosure. They do not intend to limit and should not be interpreted as limiting the scope of this disclosure in any way. Although certain embodiments and examples have been provided, based on the disclosure herein, it will be apparent to those skilled in the art that changes may be made to the illustrated embodiments and examples without departing from the scope of the disclosure.

Similar to the 4G LTE system, in the 5G NR system, both the RRC_IDLE UE and the RRC_INACTIVE UE need to monitor paging messages, and the UE monitors paging occasion (PO) with a certain discontinuous reception (DRX) cycle. This is to enable the UE to wake up to receive the paging messages only during a fixed time, and sleep for the rest of the time to reduce power consumption and prolong battery life.

The UE monitors one corresponding PO in each paging cycle, and one PO corresponds to a group of PDCCH monitoring occasions. The UE monitors whether there is a PDCCH scrambled by P-RNTI for scheduling a paging channel in the corresponding PDCCH monitoring occasions, and the monitoring result is that there may be or may not be a corresponding paging PDCCH/PDSCH. Regardless of whether the network transmits the PDCCH for scheduling the paging PDSCH in the corresponding PO, the RRC_IDLE UE and RRC_INACTIVE UE need to wake up regularly before monitoring the PO. If the UE monitors the corresponding paging PDCCH/PDSCH, it initiates a random access request or receives a broadcast system information block to obtain updated system information. If the UE does not monitor the corresponding paging PDCCH/PDSCH, it changes to a sleep state until the monitoring of the corresponding PO of a next paging cycle.

There are two main types of paging messages for the UE. The first type is paging messages from the radio access network (RAN), which mainly includes information such as system information update EWTS (earthquake and tsunami warning system) and CMAS (commercial mobile alert service). The second type is paging messages from the core network (CN), which mainly contains the paged UE ID, namely S-TMSI (SAE-temporary mobile subscriber identity) or IMSI (international mobile subscriber identity number), and information indicating whether the paging comes from a packet switch (PS) domain or a circuit switch (CS) domain.

In RRC_IDLE, the UE monitors a paging channel for paging initiated by the CN; In RRC_INACTIVE, the UE also monitors a paging channel for paging initiated by the RAN. The UE does not need to consecutively monitor the paging channel; paging DRX is defined, in which the UE in RRC_IDLE or RRC_INACTIVE only needs to monitor a paging channel during one paging occasion (PO) of each DRX cycle. The paging DRX cycle is configured by the network: for paging initiated by the CN, the default cycle is broadcast in the system information; for paging initiated by the CN, the UE specific cycle can be configured through NAS signaling; for paging initiated by the RAN, the UE specific cycle can be configured through RRC signaling. The UE uses the shortest applicable DRX cycle, that is, the UE in RRC_IDLE uses the shortest cycle among the first two cycles, while the UE in RRC_INACTIVE uses the shortest cycle among the three.

Although the paging cycle mechanism has greatly reduced the power consumption of the RRC_IDLE UE and the RRC_INACTIVE UE for monitoring paging messages, it is still necessary to further reduce the power consumption of the UE for monitoring paging messages.

Embodiments of the disclosure provide a method performed by a user equipment (UE), a method performed by a base station, a terminal and a base station. The UE receives indication information indicating whether there is a paging message to be transmitted on M paging occasions (POs) in one paging cycle, M>1, and the UE determines whether to monitor the corresponding PO in the M POs based on the received indication information, by which the base station is enabled to indicate to the UE in advance whether there is a paging message to be transmitted on M POs by transmitting the indication information to the user equipment, so that the UE does not need to monitor the corresponding PO, and therefore further reducing the power consumption of the UE.

The following first introduces the DRX cycle, the paging frame (PF), the paging occasion (PO), the PDCCH monitoring occasion, etc.

The cycle of every wake-up is called a DRX cycle. There are several paging frames (PFs) in one DRX cycle, and one PF corresponds to several POs. One UE only needs to receive paging messages on a certain PO in each DRX cycle. i_s is the number of the PO corresponding to one PF, that is, the i_s of a certain UE indicates that the UE will receive the paging message in the (i_s+1)th PO corresponding to the PF. The UE decides its own PF and i_s according to the following formula:

$$(SFN+PF\_offset) \bmod T = (T \text{ div } N)*(UE\_ID \bmod N)$$

$$i\_s = \text{floor}(UE\_ID/N) \bmod Ns$$

where:

T is a DRX cycle, and the system message contains a cell-level indication Tc, while RRC may also contain a UE-level indication Tue. If Tue is not indicated, T=Tc, and if Tue is indicated, T=min(Tc, Tue).

N: a total number of PFs in T.

Ns: a number of POs corresponding to one PF.

PF_offset: an offset of a PF.

UE_ID: 5G-S-TMSI mod 1024, where TMSI (temporary mobile subscriber identify) is the temporary mobile subscriber identity of the UE, which can be used to uniquely distinguish different UEs, and this is also used in the Msg3 of a random access. UE_id=0 by default when the UE does not have TMSI.

The above parameters N and PF_offset are determined by the high-level configuration parameter nAndPagingFrameOffset. Table 1 shows an example of the nAndPagingFrameOffset.

TABLE 1

| nAndPagingFrameOffset | CHOICE { |
|---|---|
| oneT | NULL, |
| halfT | INTEGER (0..1), |
| quarterT | INTEGER (0..3), |
| oneEighthT | INTEGER (0..7), |
| oneSixteenthT | INTEGER (0..15) |
| }, | |

The nAndPagingFrameOffset means N and PF_offset, where "oneT" means that there is one PF in one DRX cycle, that is, the length corresponding to one PF is one T, "halfT" means that there are two PFs in one DRX cycle, one PF should correspond to a half of T, and the rest is the same, and the following integer means PF_offset.

The above parameter Ns is determined by the higher layer configuration parameter ns, that is, one PF can be configured to correspond to 1, 2, or 4 POs.

Ns ENUMERATED {four, two, one},

For a certain UE, by calculating the PF, the paging frame number PF for receiving a paging message is known, and then by calculating i_s, it is known that the PO is the (i_s+1)th PO in this PF.

In LTE, one PO is one subframe, and the UE can determine the subframe for receiving a paging message after calculating the PF and PO. The search space in NR is no longer a fixed time domain location in each frame, that is, the cycle is no longer in a unit of frames but in a unit of slots, so it is necessary to determine the PDCCH monitor occasions by paging search spaces. Since each PO should correspond to all SSBs actually transmitted in an SSB set, each PO should contain S PDCCH monitoring occasions, and each PDCCH monitoring occasion corresponds to one SSB, and the S is the number of SSBs actually transmitted in one SSB set cycle. Therefore, after determining the PDCCH monitoring occasion, the PF and the PO, it is necessary to correspond the PDCCH monitoring occasion to each PO, so as to determine the PDCCH monitoring occasion of the corresponding PO of a certain UE.

In 5G, one PO is no longer a subframe but several PDCCH monitoring occasions. The mode for correspondence is determined by the parameter firstPDCCH-MonitoringOccasionOfPO in PDCCH-ConfigCommon in SIB1. Starting numbering from the first PDCCH monitoring occasion of a PF, if this parameter exists, the number of the start PDCCH monitoring occasion of the (i_s+1) th PO is the (i_s+1) th value of this parameter; if this parameter does not exist, the number of the start PDCCH monitoring occasion of the (i_s+1) th PO is i_s*S. Therefore, one PO can span one slot, one radio frame or even one paging search space.

In 5G, one PF is still one system frame, but POs are no longer only contained in one PF, that is, one PF no longer contains several POs, but corresponds to several POs, because all PDCCH monitoring occasions between two PFs are PDCCH monitoring occasions that make up POs.

Next, the specific implementation of the method performed by the user equipment provided by the embodiment of the disclosure will be described with reference to the accompanying drawings.

It is feasible for the base station to indicate in advance whether there is a paging message to be transmitted on the POs within a certain period of time, that is, the base station can know in advance whether there is a paging message to be transmitted on the POs within a certain period of time before the POs. For example, if the paging message is initiated by the CN side, there is a certain interval between the time when the paging message arrives at the base station side and the earliest PO corresponding to the paged UE. If the paging message is initiated by the RAN side, the base station can know in advance that there is a paging message to be transmitted on all POs within a period of time after the paging message is initiated. Even if the base station fails to know in advance that there is a paging message to be transmitted on the POs within a period of time before the POs, the base station can indicate in advance that there is no paging message to be transmitted on the POs and transmit a paging message on the next corresponding PO, resulting in a direct impact that transmission delay of the paging message may be increased, but this impact can be ignored considering that indicating whether there is a paging message to be transmitted in advance can effectively reduce the power consumption of the UE.

Figure 4:
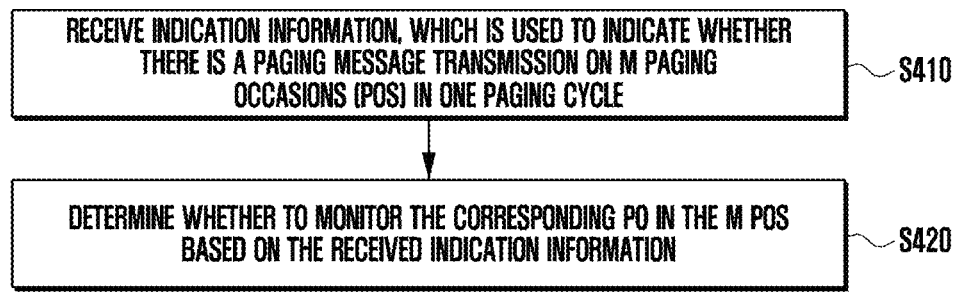
FIG. 4 illustrates a flowchart of a method performed by a user equipment (UE) according to an embodiment of the disclosure.

FIG. 4 illustrates a flowchart of a method performed by a UE according to an embodiment of the disclosure. The method includes steps S410 and S420.

In step S410, receive indication information, which is used to indicate whether there is a paging message to be transmitted on M POs in one paging cycle.

Herein, each PO in the M POs respectively corresponds to a plurality of UEs, and M>1.

In step S420, determine whether to monitor the corresponding PO in the M POs based on the received indication information.

According to the method, the base station can indicate to the UE in advance whether there is a paging message to be transmitted on M POs by transmitting indication information to the user equipment, so that the UE does not need to monitor the corresponding PO, and the power consumption of the UE can be further reduced.

The indication information will be described in detail below. The above indication information can be called, for example, but not limited to, paging early indication (PEI). Herein, the indication information and paging early indication (PEI) can be used interchangeably to represent the same information. Hereinafter, the indication information will be explained in terms of paging early indication (PEI). Of course, it can be understood that the above indication information can also be named in other ways, and any information with the same function belongs to the protection scope of the present disclosure.

Next, with reference to FIGS. 5 to 11, the contents that can be indicated by the paging early indication (PEI) in the embodiment of the disclosure will be described.

Figure 5:
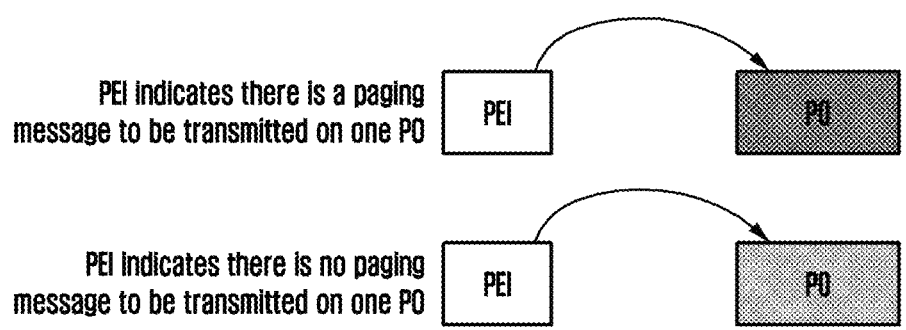
FIG. 5 illustrates a schematic diagram of contents indicated by a paging early indication (PEI) according to an embodiment of the disclosure.
Figure 6:
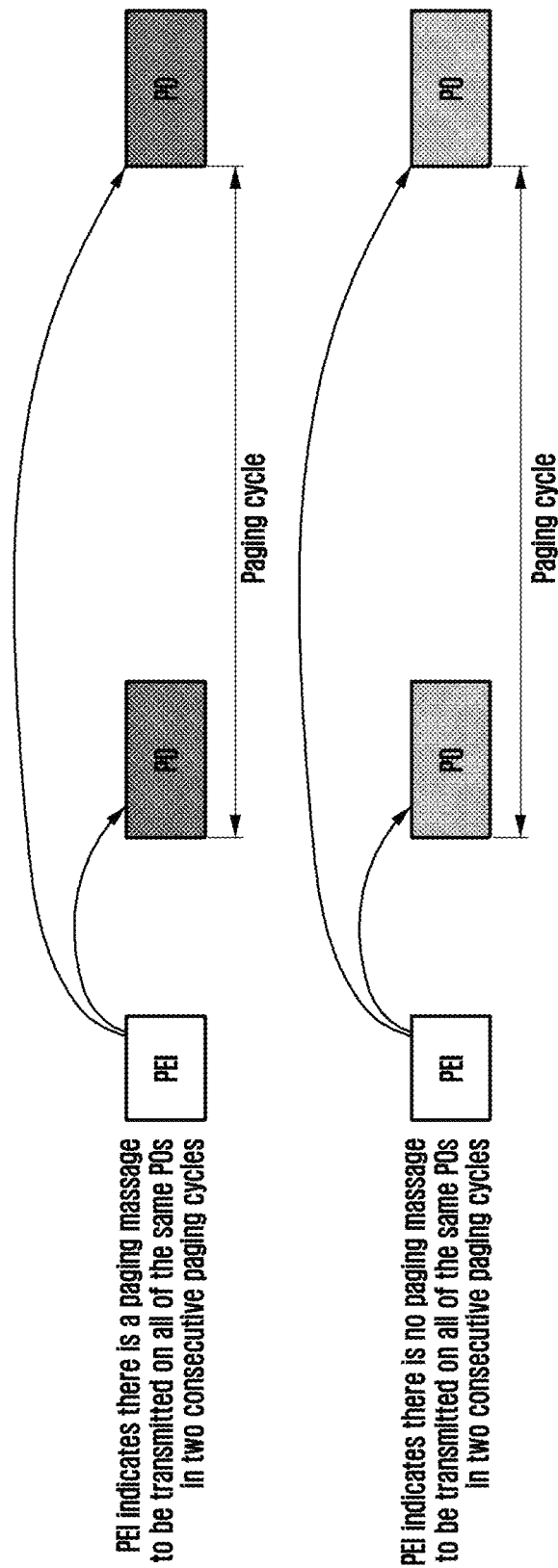
FIG. 6 illustrates a schematic diagram of contents indicated by a paging early indication (PEI) according to an embodiment of the disclosure.
Figure 7:
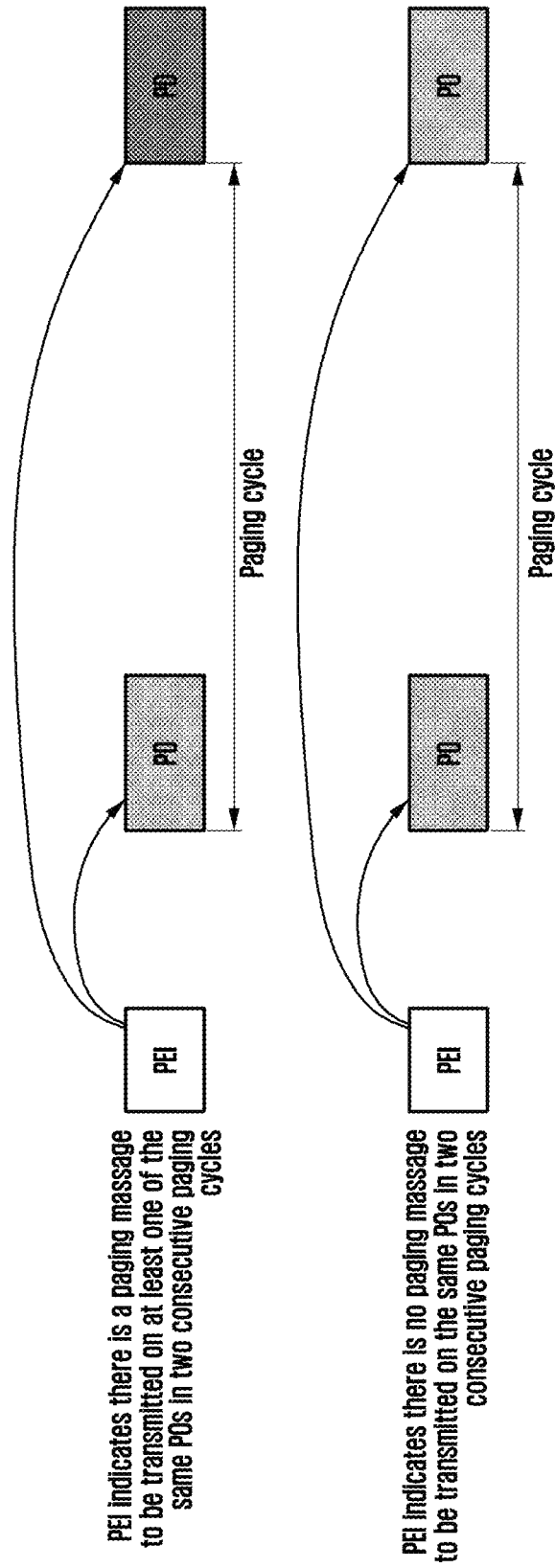
FIG. 7 illustrates a schematic diagram of contents indicated by a paging early indication (PEI) according to an embodiment of the disclosure.
Figure 8:
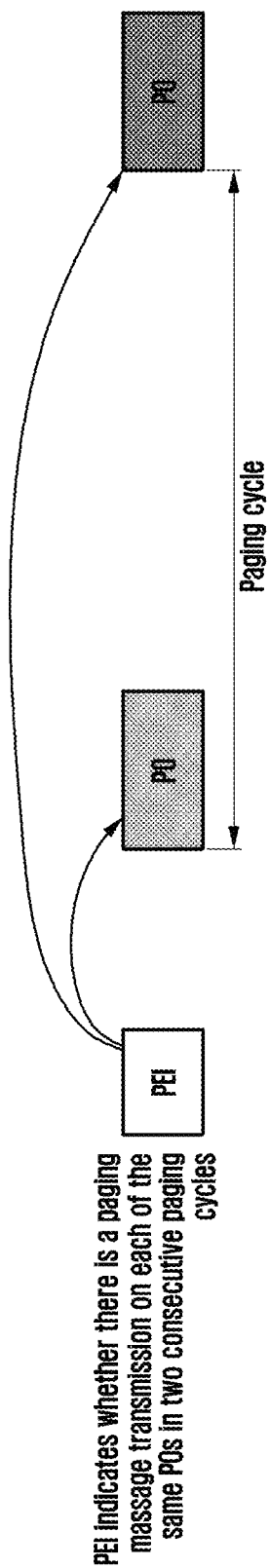
FIG. 8 illustrates a schematic diagram of contents indicated by a paging early indication (PEI) according to an embodiment of the disclosure.
Figure 9:
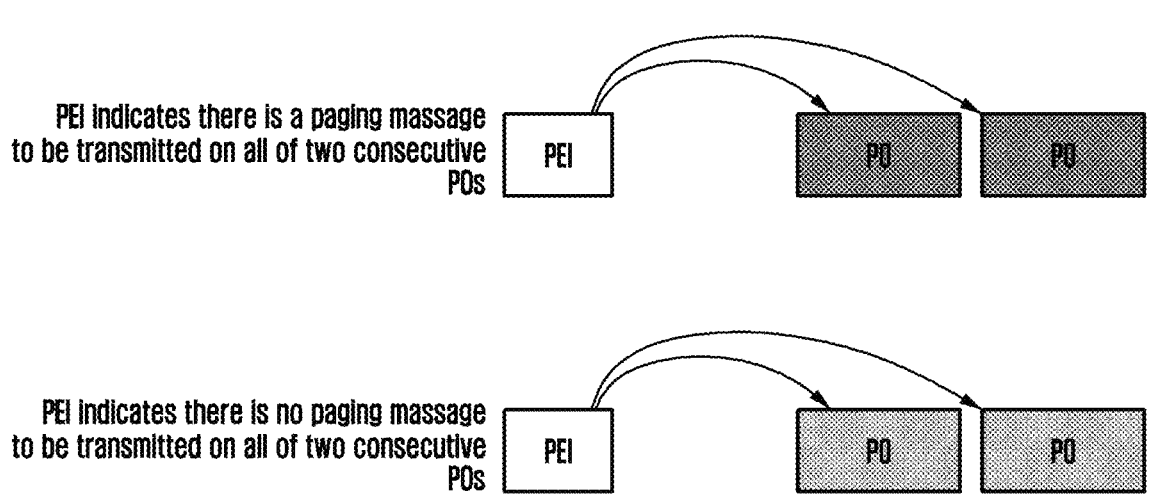
FIG. 9 illustrates a schematic diagram of contents indicated by a paging early indication (PEI) according to an embodiment of the disclosure.
Figure 10:
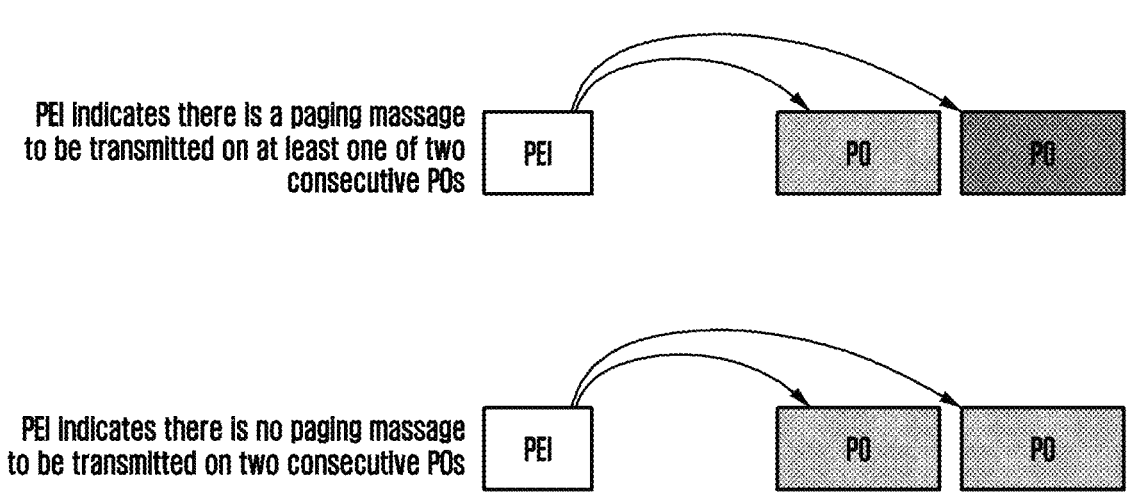
FIG. 10 illustrates a schematic diagram of contents indicated by a paging early indication (PEI) according to an embodiment of the disclosure.
Figure 11:
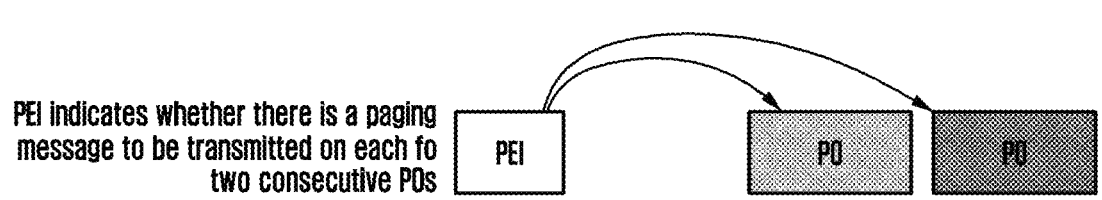
FIG. 11 illustrates a schematic diagram of contents indicated by a paging early indication (PEI) according to an embodiment of the disclosure.

FIG. 5 illustrates a schematic diagram of contents indicated by a paging early indication (PEI) according to an embodiment of the disclosure; FIG. 6 illustrates a schematic diagram of contents indicated by a PEI according to an embodiment of the disclosure; FIG. 7 illustrates a schematic diagram of contents indicated by a PEI according to an embodiment of the disclosure; FIG. 8 illustrates a schematic diagram of contents indicated by a PEI according to an embodiment of the disclosure; FIG. 9 illustrates a schematic diagram of contents indicated by a PEI according to an embodiment of the disclosure; FIG. 10 illustrates a schematic diagram of contents indicated by a PEI according to an embodiment of the disclosure; FIG. 11 illustrates a schematic diagram of contents indicated by a PEI according to an embodiment of the disclosure.

As an implementation, the paging early indication (PEI) may indicate one PO.

Optionally, the PEI may indicate in advance whether there is a paging message to be transmitted on one PO, for example, the PEI may indicate with 1-bit information. This is similar to a wakeup signal (WUS) in the existing LTE Internet of Things (IOT) system. As shown in FIG. 5, the PEI can indicate that there is a paging message to be transmitted on the corresponding PO, for example, it can be indicated by the value "1" in 1-bit information, and when the UE receives the PEI, the corresponding action of the UE is to monitor the PO; in addition, the PEI can indicate that there is no paging message to be transmitted on the corresponding PO, for example, it can be indicated by the value "0" in 1-bit information, when the UE receives the PEI, the corresponding action of the UE is to skip this PO, that is, not to monitor this PO.

As an implementation, the paging early indication (PEI) may indicate the same POs in multiple paging cycles.

Optionally, the PEI may indicate in advance whether there is a paging message to be transmitted on the same POs in multiple consecutive paging cycles. Here, the same POs in multiple consecutive paging cycles are from the perspective of UE, that is, the multiple POs are corresponding POs of several UEs in different paging cycles.

The specific content indicated by the PEI can be further indicated in any of the following ways:

As an example, the PEI may indicate in advance whether there are paging messages on the same POs in multiple consecutive paging cycles, for example, the PEI may indicate with 1-bit information. As shown in FIG. 6, the PEI can indicate that there is a paging message to be transmitted on all of the same POs in multiple consecutive paging cycles, for example, it can be indicated by the value "1" in 1-bit information, and when the UE receives the PEI, the corresponding action of the UE is to monitor these POs; in addition, the PEI may indicate that there is no paging message to be transmitted on all of the same POs in multiple consecutive paging cycles, for example, it may be indicated by the value "0" in 1-bit information, and when the UE receives the PEI, the corresponding action of the UE is to skip the multiple POs.

As an example, the PEI may indicate in advance that there is no paging message to be transmitted on all of the same POs in multiple consecutive paging cycles, or that there is a paging message to be transmitted on at least one PO in the same POs in multiple consecutive paging cycles. For example, the PEI may indicate with 1-bit information. As shown in FIG. 7, the PEI can indicate that there is no paging message to be transmitted on all of the same POs in multiple consecutive paging cycles, for example, it can be indicated by the value "0" in 1-bit information, and when the UE receives the PEI, the corresponding action of the UE is to skip the multiple POs; in addition, the PEI may indicate that there is a paging message to be transmitted on at least one PO in the same POs in multiple consecutive paging cycles, for example, it may be indicated by the value "1" in 1-bit information, and when the UE receives the PEI, the corresponding action of the UE is to monitor the multiple POs.

As an example, as shown in FIG. 8, the PEI can indicate in advance whether there is a paging message to be transmitted on each PO in the same POs in multiple consecutive paging cycles, that is, indicate whether there is a paging message to be transmitted for each PO, respectively. For example, the PEI can be indicated with more than 1 bit of information. Assuming the PEI corresponds to the same POs in M paging cycles, the PEI can be indicated with M bits of information. Upon receiving the PEI, the corresponding action of the UE may be, for example, to monitor a PO with a paging message to be transmitted or to skip a PO without a paging message to be transmitted.

As an implementation, the paging early indication (PEI) may indicate a plurality of consecutive POs. It can be understood that the paging early indication (PEI) indicating multiple consecutive POs can make the system simpler as compared with indicating discontinuous POs.

Optionally, the PEI may indicate in advance whether there is a paging message to be transmitted on multiple consecutive POs. Here, the multiple POs are from the perspective of the base station, that is, the multiple POs respectively correspond to serval different UEs. In addition, consecutive POs mean that POs are relatively consecutive in logical time, but do not mean that POs are absolutely consecutive in physical time.

The specific content indicated by the PEI can be further indicated in any of the following ways:

As an example, the PEI can indicate in advance whether there are paging messages on multiple consecutive POs, for example, the PEI can indicate with 1-bit information. As shown in FIG. 9, the PEI can indicate that there is a paging message to be transmitted on all of the multiple consecutive POs, for example, it can be indicated by the value "1" in 1-bit information, and when the UE receives the PEI, the corresponding action of the UE is to monitor the corresponding PO of the multiple POs; in addition, the PEI may indicate that there is no paging message to be transmitted on all of multiple consecutive POs, for example, it may be indicated by the value "0" in 1-bit information, and when the UE receives the PEI, the corresponding action of the UE is to skip the corresponding PO of the multiple POs.

As an example, the PEI may indicate in advance that there is no paging message to be transmitted on a plurality of consecutive POs, or that there is a paging message to be transmitted on at least one PO in the plurality of consecutive POs. For example, the PEI may indicate with 1-bit information. As shown in FIG. 10, the PEI may indicate that there is no paging message to be transmitted on all of the plurality of consecutive POs, for example, it may be indicated by the value "0" in 1-bit information, and when the UE receives the PEI, the corresponding action of the UE is to skip the corresponding PO in the plurality of POs; in addition, the PEI may indicate that there is a paging message to be transmitted on at least one PO in the plurality of consecutive POs, for example, it may be indicated by the value "1" in 1-bit information, and when the UE receives the PEI, the corresponding action of the UE is to monitor the corresponding PO in the plurality of POs.

As an example, as shown in FIG. 11, the PEI can indicate in advance whether there is a paging message to be transmitted on each of the POs in multiple consecutive paging cycles, that is, indicate whether there is a paging message to be transmitted for each PO, respectively. For example, the PEI can be indicated with more than 1 bit of information. Assuming the PEI corresponds to the same POs in M paging cycles, the PEI can be indicated with M bits of information. Upon receiving the PEI, the corresponding action of the UE may be to monitor the corresponding PO with a paging message to be transmitted, or to skip the corresponding PO without the paging message to be transmitted.

It can be understood that the embodiments of this disclosure provide a variety of specific implementations of the contents indicated by the PEI, which makes the implementation of the system more diverse and more flexible. In addition, when 1 bit is used to indicate the PEI, the signaling overhead is reduced, and the power consumption of the system is further reduced.

Next, with reference to FIG. 12 and FIG. 13, the number of a plurality of POs indicated by the paging early indication (PEI) in the embodiment of the disclosure will be described.

Figure 12:
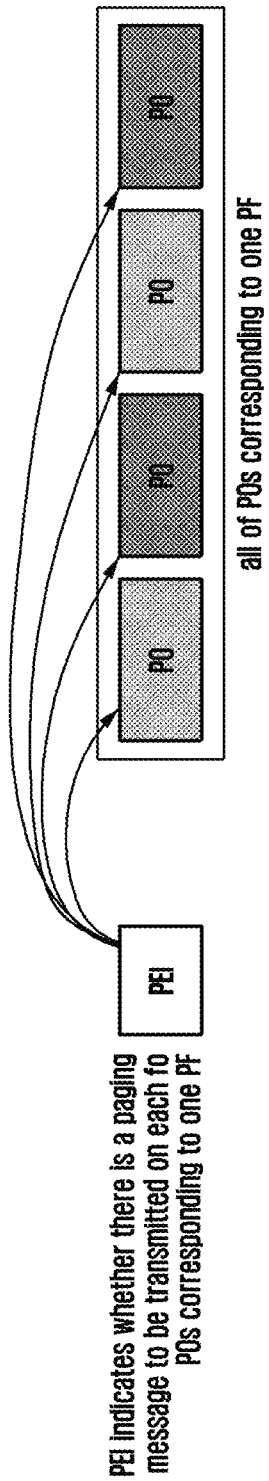
FIG. 12 illustrates a schematic diagram of the number of a plurality of POs indicated by a paging early indication (PEI) according to an embodiment of the disclosure.

FIG. 12 illustrates a schematic diagram of the number of a plurality of POs indicated by a paging early indication (PEI) according to an embodiment of the disclosure; FIG. 13 illustrates a schematic diagram of the number of a plurality of POs indicated by a PEI according to an embodiment of the disclosure.

With respect to the PEI that indicates in advance whether there is a paging message to be transmitted on a plurality of consecutive POs, further, the number of consecutive POs indicated by the PEI in advance may be any one of the following, for example:

(1) The number of consecutive POs that a PEI can indicate in advance is a predefined value, that is, a fixed value. For example, the system can specify this value as 1, 2 or 4. When the system specifies this value as 1, that is, the PEI can indicate in advance whether there is a paging message to be transmitted on one PO.

(2) The number of consecutive POs that a PEI can indicate in advance is a preconfigured value, that is, a configurable value, which may not be fixed but may be changed. For example, the system can configure this value to be 1, 2 or 4.

(3) As shown in FIG. 12, the number of consecutive POs that a PEI can indicate in advance is the total number of POs corresponding to one PF, in other words, a PEI can indicate in advance whether there is a paging message to be transmitted on the POs corresponding to one PF, that is, one PEI is associated with one PF. That is, the number of consecutive POs that a PEI can indicate in advance is Ns, which can be configured to be, for example, 1, 2, 4, etc.

(4) The number of consecutive POs that a PEI can indicate in advance is the total number of POs corresponding to multiple PFs. In other words, a PEI can indicate in advance whether there is a paging message to be transmitted on POs corresponding to multiple PFs, that is, one PEI is associated with multiple PFs. Assuming that a PEI can indicate in advance whether there is paging message transmission on the POs corresponding to N_PF PFs, the number of consecutive POs that a PEI can indicate in advance is N_PF*Ns, and N_PF can be a predefined or preconfigured value.

Figure 13:
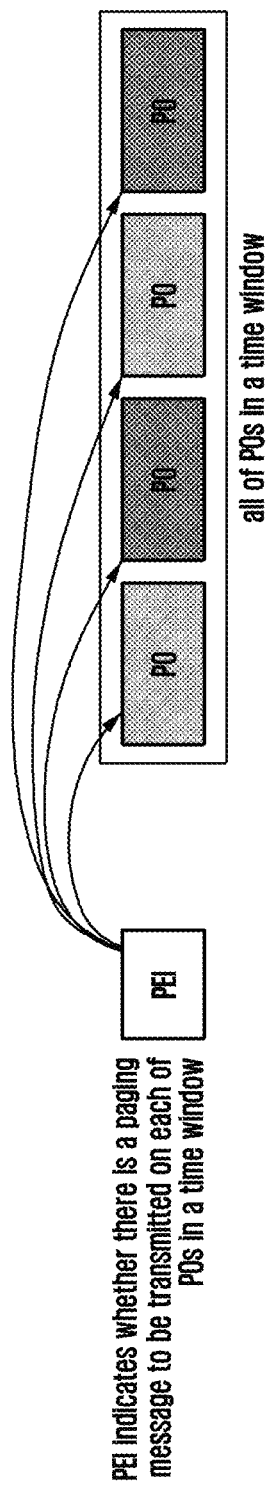
FIG. 13 illustrates a schematic diagram of the number of a plurality of POs indicated by a paging early indication (PEI) according to an embodiment of the disclosure.

(5) As shown in FIG. 13, the number of consecutive POs that a PEI can indicate in advance is the total number of POs within a time window, the length of the time window is a predefined or preconfigured value, and the measurement unit is ms, for example, the time window is 20 ms, that is, a PEI can indicate in advance whether there is a paging message to be transmitted on POs within 20 ms. As a PO is composed of a group of PDCCH monitoring occasions, as long as the first PDCCH monitoring occasion of the PO is included in the time window, it can be considered that the PO is included in the time window, without limiting the entire duration of the PO to be included in the time window.

(6) The number of consecutive POs that a PEI can indicate in advance is the total number of POs in one SSB cycle, in other words, a PEI can indicate in advance whether there is a paging message to be transmitted on POs in one SSB cycle, that is, one PEI is associated with one SSB cycle. Similar to the above-mentioned total number of POs in the time window, as long as the first PDCCH monitoring occasion of the PO is included in one SSB cycle, it can be considered that the PO is included in the SSB cycle, without limiting the entire duration of the PO to be included in the SSB cycle. Since there is no correlation between the location and density of POs and an SSB cycle, the number of POs contained in different SSB cycles may be different, that is, the number of POs indicated by PEIs corresponding to different SSB cycles may be different, and even there may be no PO in some SSB cycles, so there is no corresponding PEI in this SSB cycle.

(7) The number of consecutive POs that a PEI can indicate in advance is the total number of POs in multiple SSB cycles, in other words, a PEI can indicate in advance whether there is a paging message to be transmitted on POs in multiple SSB cycles, that is, one PEI is associated with multiple SSB cycles.

It can be understood that the embodiments of the disclosure provide a variety of specific implementations of the number of multiple POs indicated by the paging early indication (PEI), which makes the implementation of the system more diverse and flexible. In addition, the more the total number of POs indicated by one PEI, the less the number of PEIs that the base station needs to transmit, thus reducing the signaling overhead and further reducing the power consumption of the system.

Figure 14:
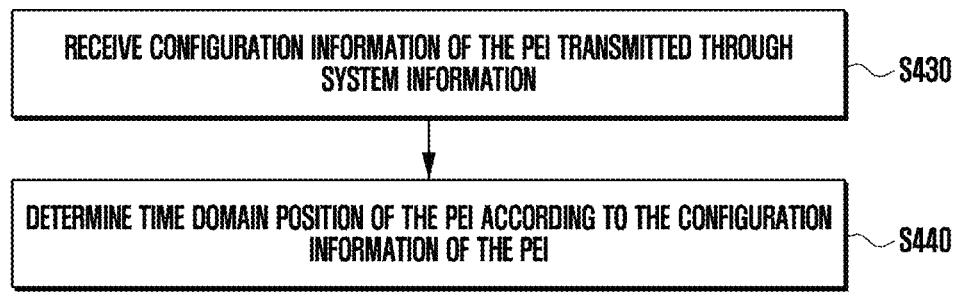
FIG. 14 illustrates a flowchart of a part of steps of a method performed by UE provided by an embodiment of the disclosure.

With reference to FIG. 14, the method performed by the UE provided by the embodiment of the disclosure will be described below. FIG. 14 illustrates a flowchart of a part of steps of a method performed by the UE provided by an embodiment of the disclosure.

As an implementation, before step S410, the above method may further include step S430 and step S440.

In step S430, receive configuration information of the PEI transmitted through system information.

In step S440, determine time domain location of the PEI according to the configuration information of the PEI.

The method for determining the time domain location of the PEI will be described in detail below.

As an implementation, the time domain location of the PEI can be associated with the SSB location.

Figure 15:
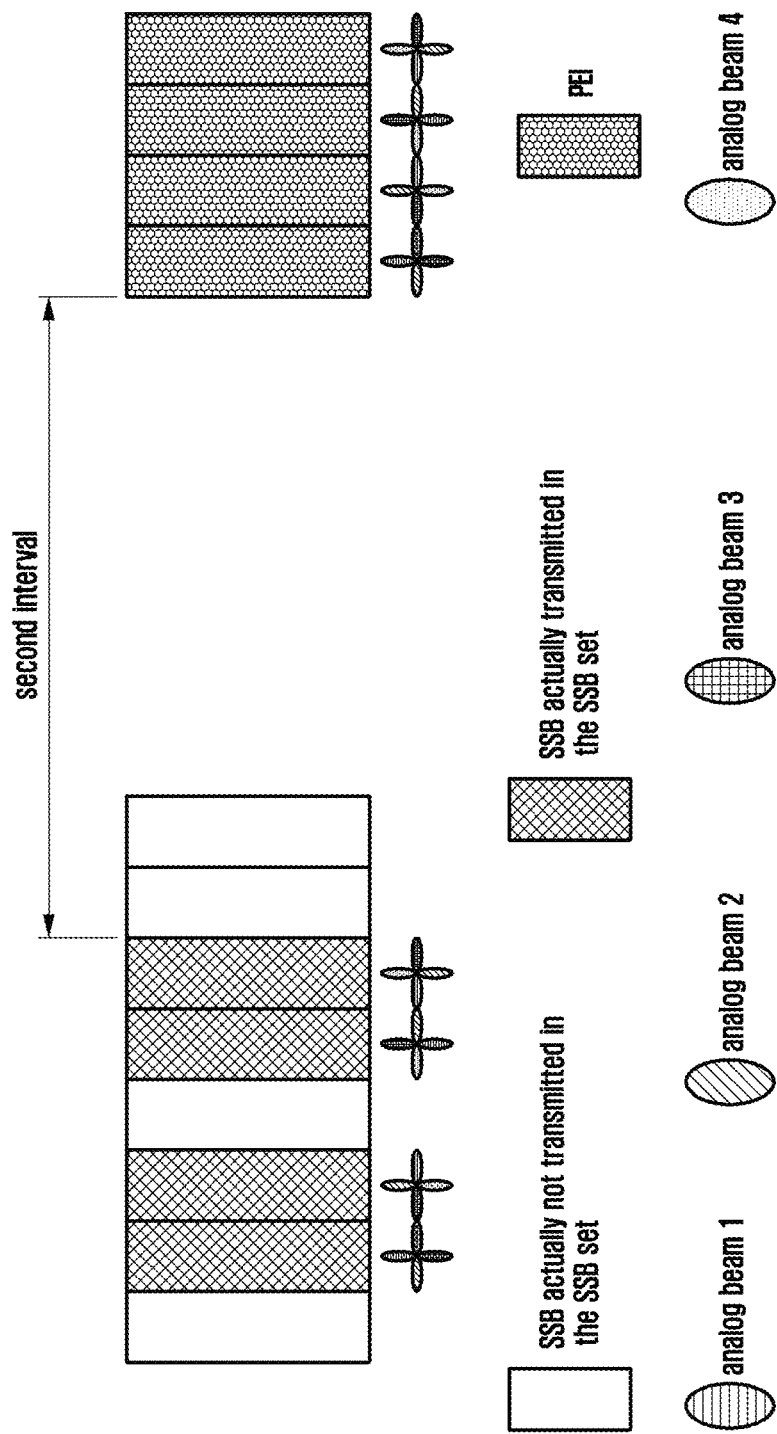
FIG. 15 illustrates a schematic diagram in which time domain locations of PEIs are associated with locations of SSBs according to an embodiment of the disclosure.
Figure 16:
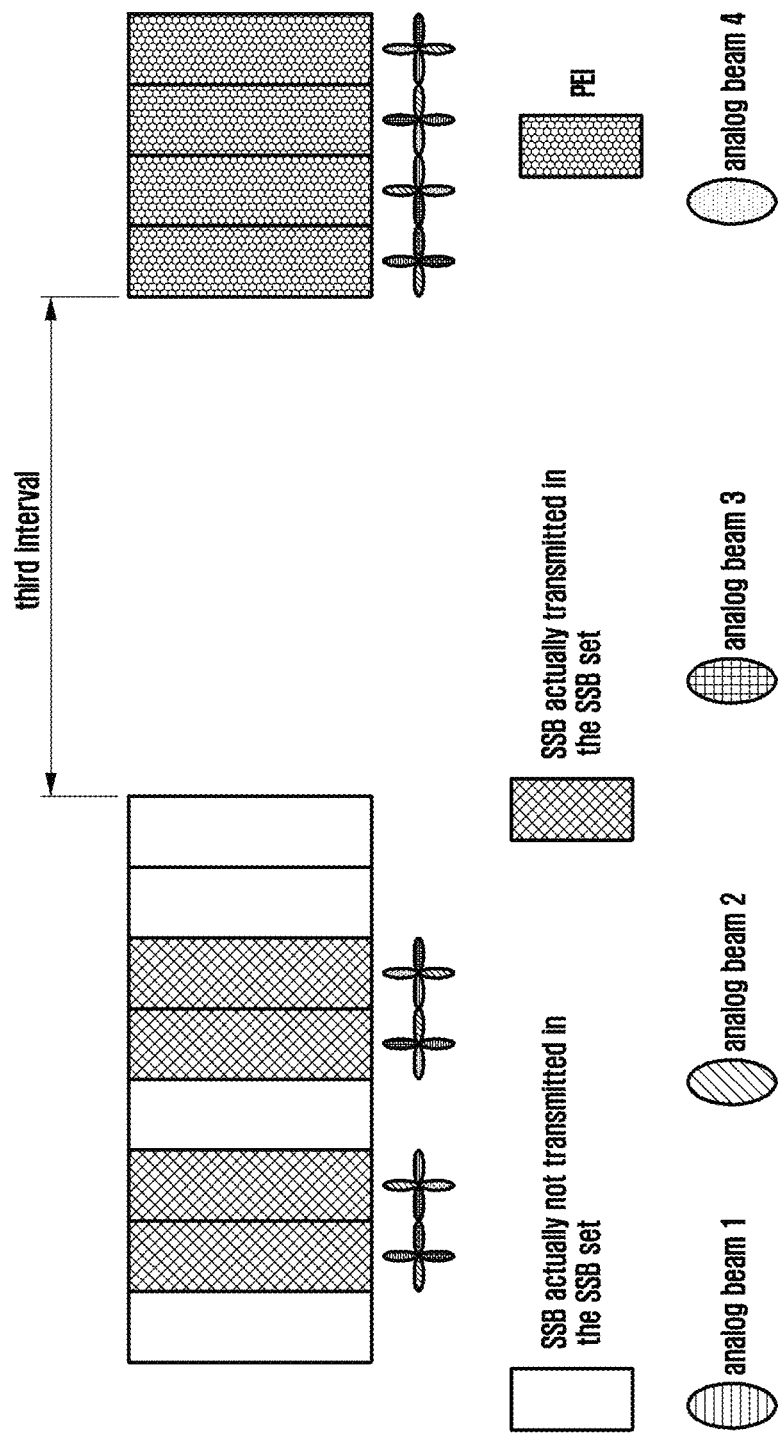
FIG. 16 illustrates a schematic diagram in which time domain locations of PEIs are associated with locations of SSBs according to an embodiment of the disclosure.
Figure 17:
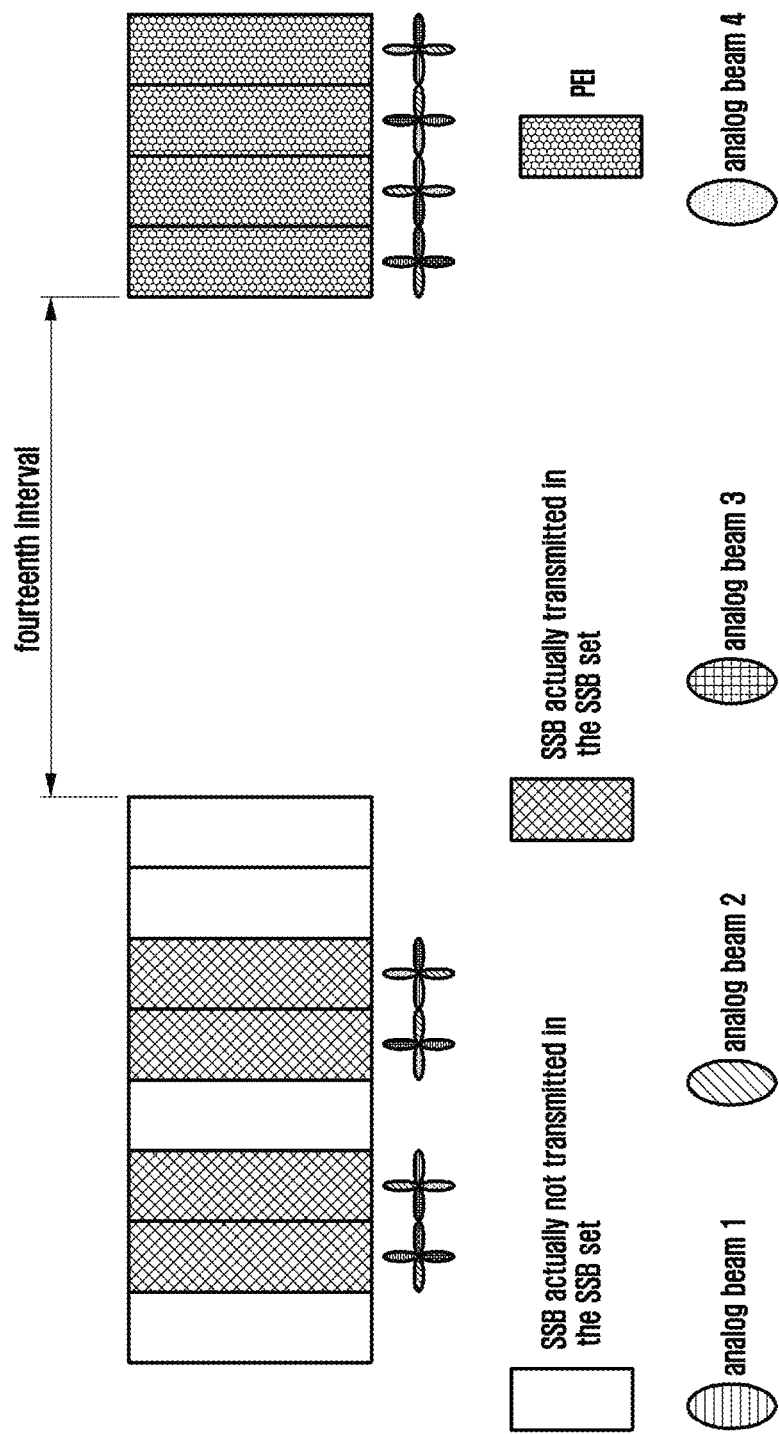
FIG. 17 illustrates a schematic diagram in which time domain locations of PEIs are associated with locations of SSBs according to an embodiment of the disclosure.
Figure 18A:
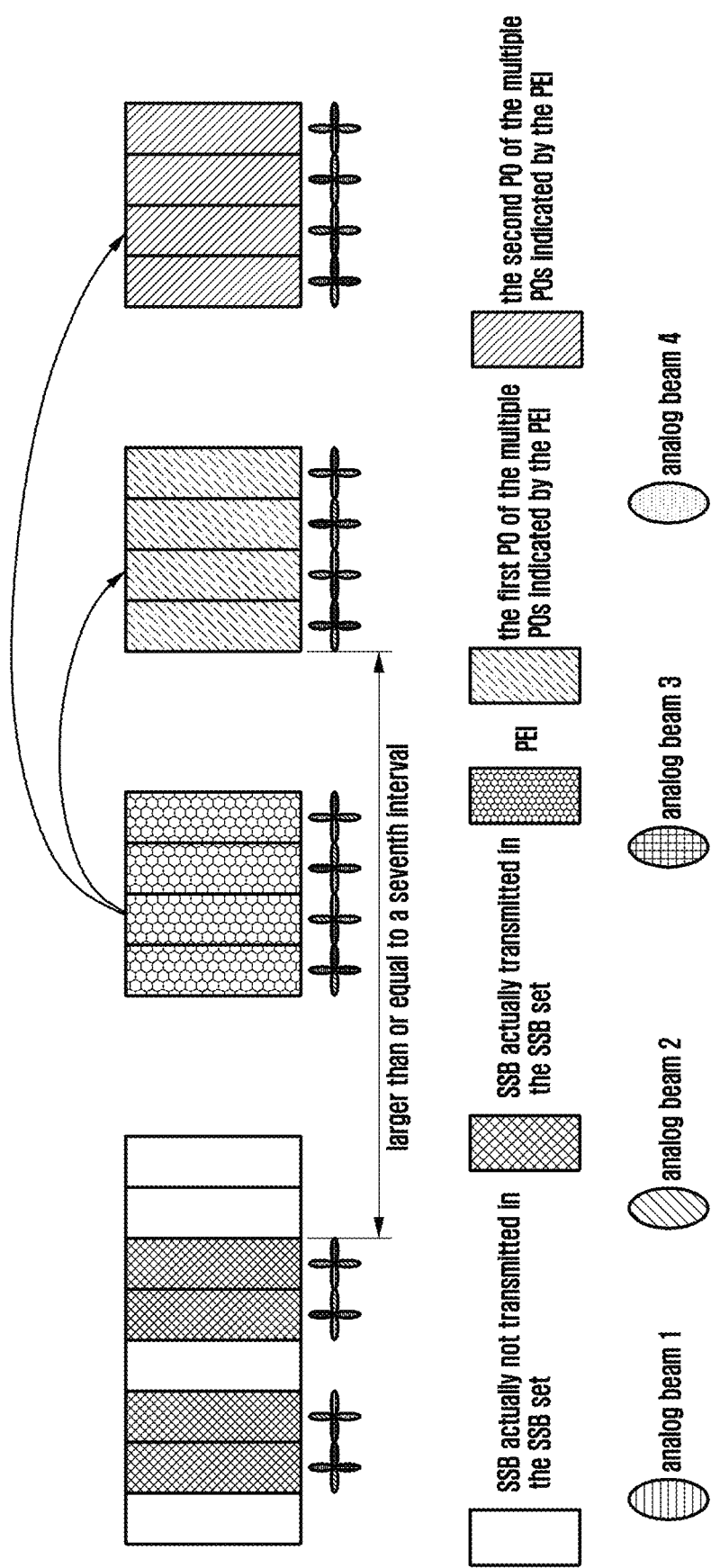
FIG. 18A illustrates a schematic diagram in which SSBs for determining time domain locations of PEIs are associated with POs according to an embodiment of the disclosure.
Figure 18B:
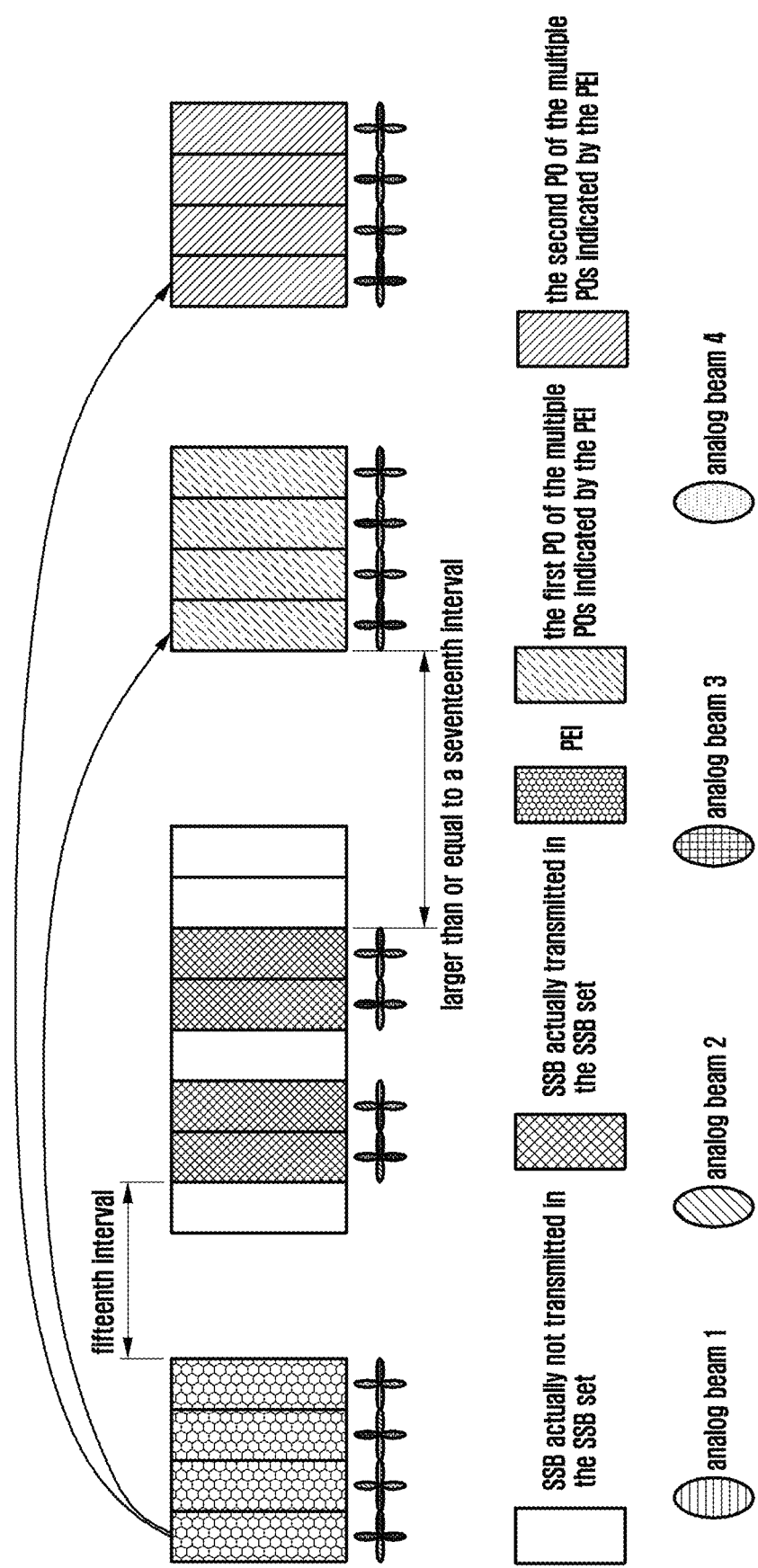
FIG. 18B illustrates a schematic diagram in which time domain locations of PEIs are associated with locations of SSBs and SSBs for determining time domain locations of PEIs are associated with POs according to an embodiment of the disclosure.
Figure 18C:
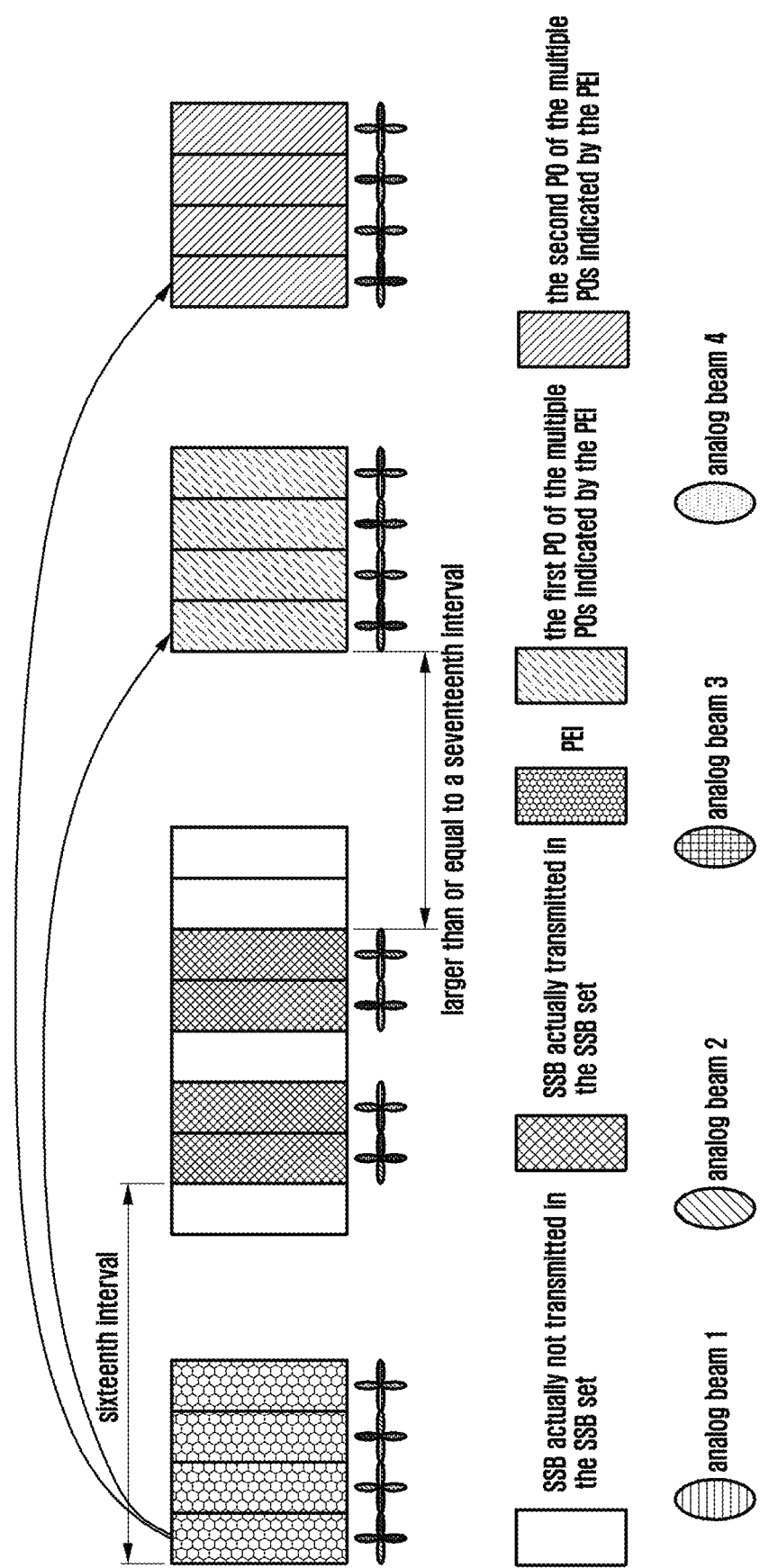
FIG. 18C illustrates a schematic diagram in which time domain locations of PEIs are associated with locations of SSBs and SSBs for determining time domain locations of PEIs are associated with POs according to an embodiment of the disclosure.

The following describes how time domain locations of PEIs are associated with locations of SSBs with reference to FIGS. 15 to 18C. FIG. 15 illustrates a schematic diagram in which time domain locations of PEIs are associated with locations of SSBs according to an embodiment of the disclosure; FIG. 16 illustrates a schematic diagram in which time domain locations of PEIs are associated with locations of SSBs according to an embodiment of the disclosure; FIG. 17 illustrates a schematic diagram in which time domain locations of PEIs are associated with locations of SSBs according to an embodiment of the disclosure; FIGS. 18A to 18C illustrates a schematic diagram in which SSBs for determining time domain locations of PEIs is associated with POs according to an embodiment of the disclosure.

The RRC_IDLE UE and RRC_INACTIVE UE do not have the ability to monitor the PO immediately after changing from sleep state to wakeup state, but need to do some preparation work, such as time-frequency synchronization. Therefore, the UE needs to receive the SSB to synchronize the clock frequency before monitoring POs, and the UE is well prepared for monitoring POs based on the received SSB. This preparation work can be called warmup, which takes a certain amount of time, and may take different time depending on the different UE capabilities. The UE should consider its own warmup time, and wake up ahead of the SSB which at least meets the warmup time interval before the corresponding PO. After waking up, the UE should first receive the SSB, prepare time-frequency synchronization based on the SSB, and then monitor the corresponding PO after warmup.

When the SSB cycle is large, for example, when the SSB cycle is configured to be 160 ms, there may be a long time between the PO and the latest SSB ahead. After receiving the SSB and completing the warmup, the UE may have to wait for a long time before starting to monitor the PO. During this time, the UE still needs to maintain a high level of power. If the UE can know as soon as possible that there is no paging message to be transmitted on the corresponding PO, it can enter the deep sleep state in advance. Therefore, a PEI can follow the SSB. After receiving the SSB and completing time-frequency synchronization, the UE can receive the PEI and decide whether to monitor the corresponding PO according to the indication information of the PEI.

Similar to the PO, a PEI is also a broadcast channel/signal, which needs to be received by several UEs, so the PEI also needs to be transmitted based on the way of beam sweeping, that is, the base station transmits PEIs in S beam directions by beam sweeping, and the S is the value of the parameter ssb-LocationsInBurst indicated in SIB1, that is, the number of SSBs actually transmitted in one SSB cycle, which can correspond to up to S different analog beam directions, that is, the PEI can be transmitted in turn in S different analog beam directions.

As mentioned above, one PO contains a group of PDCCH monitoring occasions. When the parameter nrofPDCCH-MonitoringOccasionPerSSB-InPO=1, one PO contains S PDCCH monitoring occasions, where the K-th PDCCH monitoring occasion of a PO corresponds to the K-th SSB actually transmitted in one SSB cycle, K=1, 2, . . . , S; when the parameter nrofPDCCH-MonitoringOccasionPerSSB-InPO=X, one PO contains S*X PDCCH monitoring occasions, where the (x*S+K)th PDCCH monitoring occasion of a PO corresponds to the K-th SSB actually transmitted in one SSB cycle, where x=0, 1, . . . , X−1, K=1, 2, . . . , S.

Similar to the correspondence between the PO and the SSB, the PEI and the SSB also have correspondence. The base station transmits the indication information PEI in S beam directions by beam sweeping. The PEI of S beam directions should correspond to S SSBs actually transmitted in one SSB cycle, respectively. For example, the PEI of the K-th beam direction corresponds to the same beam direction as the K-th SSB actually transmitted in one SSB cycle, with K=1, 2, . . . , S.

Optionally, the time domain location of the PEI in the K-th beam direction is determined by the time domain location of the K-th SSB actually transmitted in one SSB cycle, that is, the time domain location of the PEI in the K-th beam direction is associated with the time domain location of the SSB of the corresponding beam. For example, the start location of the PEI in the K-th beam direction is a location with a first interval apart and after the end location of the K-th SSB actually transmitted in one SSB cycle, and the first interval is a predefined or preconfigured value or a value reported by the UE to the base station. For example, the first interval may include at least one of processing time for receiving the SSB or preparation time for receiving the PEI by the UE.

As an example, the first intervals between the PEIs of S beam directions and S corresponding SSBs actually transmitted all use the same value. That means, assuming that the duration of transmission of a PEI in one beam direction is the same as that of one SSB. If two SSBs actually transmitted have a certain interval in time, the corresponding PEI of two beam directions also have the same interval, that is, the time domain locations of a PEI of S beam directions are the translated locations of S SSBs actually transmitted.

As another example, the first intervals between the PEIs of S beam directions and S corresponding SSBs actually transmitted can use different values, and the system predefines or preconfigures the value of the first interval between a PEI of each beam direction and the corresponding SSB, respectively.

Optionally, the system only predefines or preconfigures the value of a second interval between the PEI of the last beam direction and the corresponding last SSB actually transmitted. For example, the start location of the PEI of the last beam direction is a location with a second interval apart and after the end location of the last SSB actually transmitted in one SSB cycle. The locations of PEIs of other beam directions except the PEI of the last beam direction among the PEIs of S beam directions is determined by the location of the PEI of the last beam direction. For example, the system specifies that PEIs of multiple beam directions are relatively consecutive in time domain, so the time domain locations of PEIs of other beam directions can be easily obtained according to the time domain location of the PEI of the last beam direction. As shown in FIG. 15, there is a second interval between the start location of the PEI of the last beam direction and the end location of the last SSB actually transmitted in one SSB cycle. The second interval may be a predefined or preconfigured value or configured by the base station for the UE, and may at least include the processing time for receiving an SSB and/or the preparation time for receiving a PEI by the UE.

Optionally, the time domain location of a PEI is determined by the time domain locations of an SSB set, which is a group of SSBs within one SSB cycle, that is, the time domain location of a PEI is associated with the time domain locations of an SSB set. Further, the start location of a PEI is determined by the end location of an SSB set. For example, the start location of a PEI of the first beam direction is a location with a third interval apart and after the end location of the last SSB actually transmitted in one SSB cycle. The third interval may be a predefined or preconfigured value or a value reported by the UE to the base station. The third interval may at least include the processing time for receiving the SSB and the preparation time for receiving the PEI by the UE.

As an example, as shown in FIG. 16, the end location of the SSB set mentioned above refers to the end location of the last SSB actually transmitted in the SSB set, that is, the time domain location of a PEI is determined by the location of the last SSB actually transmitted in the SSB set.

As another example, as shown in FIG. 17, the end location of the SSB set mentioned above refers to the end location of the last SSB in the SSB set pattern, that is, the time domain location of a PEI is determined by the location of the last SSB in the SSB set pattern, where the location of the last SSB in the SSB set pattern refers to the location of the last SSB in the SSB set pattern defined by the system, regardless of whether the SSB is actually transmitted. For example, the start location of a PEI of the first beam direction is a location with a fourteenth interval apart and after the end location of the last SSB in the SSB set pattern. The fourteenth interval may be a predefined or preconfigured value or a value reported by the UE to the base station. As an implementation, the size of the third interval may be the same as or different from the size of the fourteenth interval.

Furthermore, if the system specifies that the time domain locations of PEIs are associated with the locations of SSBs, the UE should first determine the SSB location corresponding to a PO, and then determine the PEI location by the corresponding SSB location.

As mentioned above, the UE should wake up and receive the SSB in advance to be prepared for time-frequency synchronization before monitoring a PO, so the usage for the SSB being associated with the PEI location is for this purpose. As shown in FIG. 18A, the SSB used to determine the time domain location of a PEI is the last SSB actually transmitted with at least a seventh interval apart and before the start location of the first PO among the multiple POs indicated by the PEI, that is, the interval between the SSB associated with the PEI and the first PO among the multiple POs indicated by the PEI should be greater than or equal to the seventh interval. The seventh interval may include at least one of processing time for receiving an SSB, preparation time for receiving a PO by the UE and complete duration of PEI transmission. If a PEI indicates whether there is a paging message to be transmitted on one PO, the SSB associated with the location of the PEI can be the latest SSB before the PO indicated by the PEI that meets the seventh interval. The seventh interval may be a predefined or preconfigured value or a value reported by the UE to the base station.

As another example, the location of a PEI may also be before the location of the SSB set. For example, if a PEI is carried by a physical sequence signal, the UE may not need to meet the precondition of time-frequency synchronization before detecting PEI, so there is no need to place the PEI behind the SSB set. If a PEI indicates that the UE needs to monitor a PO, the UE needs to receive an SSB for time-frequency synchronization after the monitoring of the PO. If a PEI indicates that the UE does not need to monitor a PO, the UE can skip the SSB reception and go to sleep directly, so the PEI can be placed near and before the SSB set, for example, in a location with a specific time interval apart and before the SSB set.

As shown in FIG. 18B, the location of the PEI is before the location of the SSB set, and the time interval between the end location of the last beam of the PEI and the start location of the first SSB actually transmitted in the SSB set is a fifteenth interval, which can be a predefined or preconfigured value or a value reported by the UE to the base station, and at least includes at least one of the processing time for receiving the PEI and the preparation time for receiving SSB by the UE; or, as shown in FIG. 18C, the location of a PEI may be before the location of the SSB set, and the time interval between the start location of the first beam of the PEI and the start location of the first SSB actually transmitted in the SSB set is a sixteenth interval, which may be a predefined or preconfigured value or a value reported by the UE to the base station, and at least includes at least one of PEI transmission time, processing time for receiving PEI, and preparation time for receiving SSB by the UE.

In FIGS. 18B and 18C, the base station and the UE have the same knowledge of the SSB set for determining the time domain location of the PEI. For example, the SSB set can be the latest SSB set with at least a seventeenth interval apart and before the start location of the first PO among the multiple POs indicated by the PEI, that is, the interval between the SSB set for determining the time domain location of the PEI and the first PO among the multiple POs indicated by the PEI should be greater than or equal to the seventeenth interval; or, the SSB set for determining the time domain location of the PEI can be the N-th SSB set from a location with at least a seventeenth interval apart and before the start location of the first PO among the multiple POs indicated by the PEI, and N is a predefined or preconfigured value or a value reported by the UE to the base station, where N>1, which is in consideration that the time-frequency synchronization requirements for receiving a PO may not meet if the UE receives one SSB set, and that the UE needs to receive N SSB sets to meet the time-frequency synchronization requirements for receiving a PO, and the value of the N can be related to the time-frequency synchronization capability of the UE based on SSB reception, that is, different UEs may have different values of N. This method for determining the SSB set can also be applied to the situation where a PEI is placed at a nearby location behind the SSB set.

Herein, the seventeenth interval may include at least one of processing time for receiving the SSB and preparation time for receiving the PO by the UE. If a PEI indicates whether there is a paging message to be transmitted on one PO, the SSB associated with the location of the PEI can be the latest SSB before the PO indicated by the PEI that meets the seventeenth interval. The seventeenth interval may be a predefined or preconfigured value or a value reported by the UE to the base station. Without been limited to the example in the figure, PEIs in FIGS. 18B and 18C may also indicate only one PO. It can be understood that the embodiments of the disclosure provide a variety of specific implementations in which the time domain locations of PEIs can be associated with that of SSBs. The time domain locations of PEIs are determined by using the association relationship between the time domain locations of PEIs and the time domain locations of SSBs, which makes the determination of time domain locations of PEIs more diversified and more accurate.

As an implementation, the time domain locations of PEIs can be associated with the time domain locations of POs.

Figure 19:
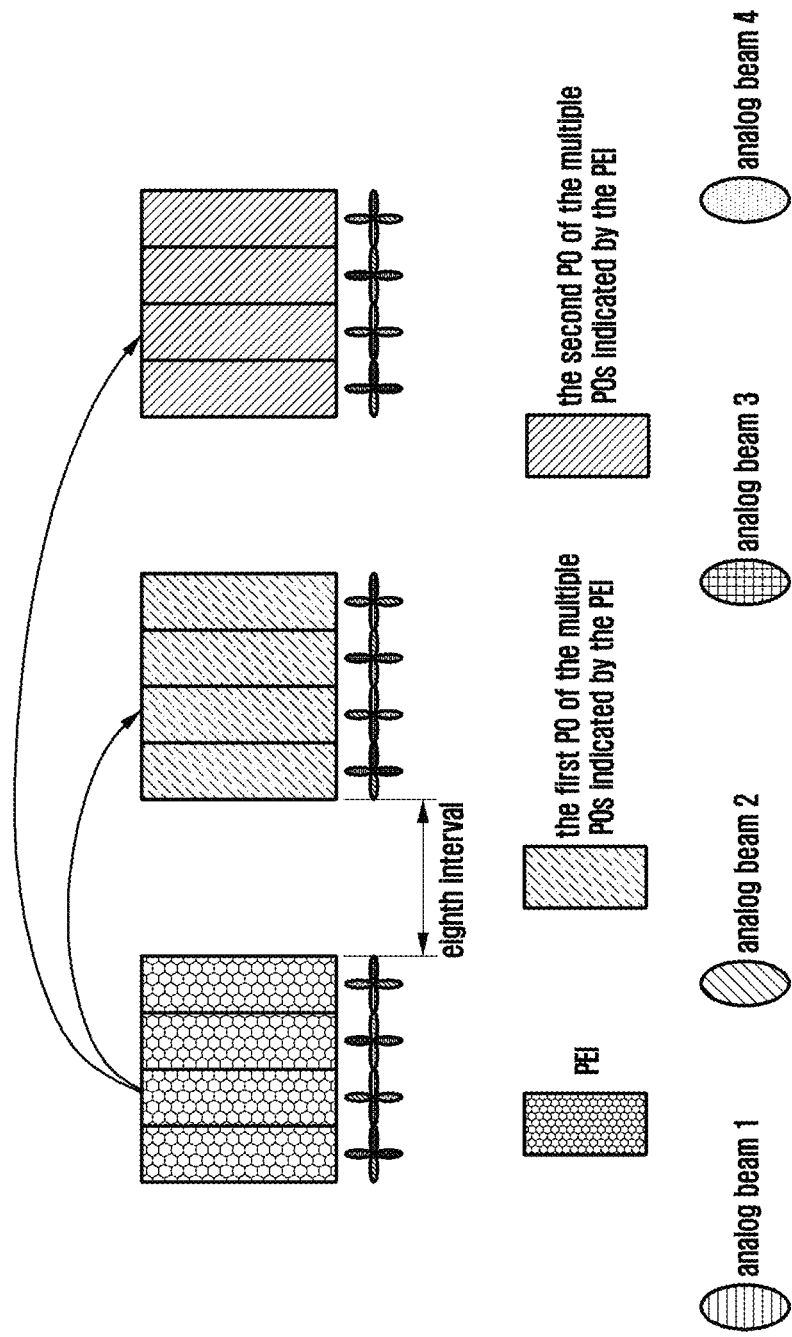
FIG. 19 illustrates a schematic diagram of time domain locations of PEIs and time domain locations of POs according to an embodiment of the disclosure.
Figure 20:
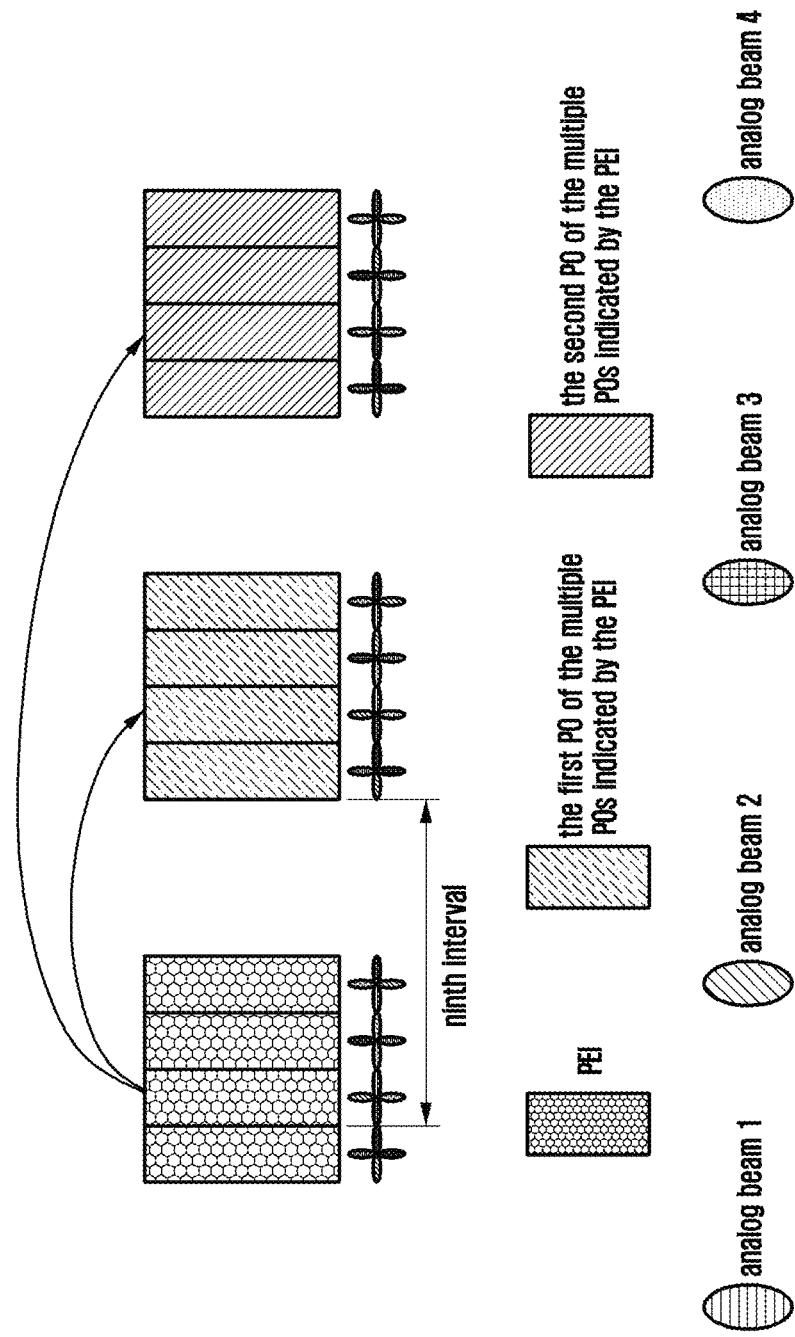
FIG. 20 illustrates a schematic diagram of time domain locations of PEI and time domain locations of POs according to an embodiment of the disclosure.

The following describes how the time domain locations of the PEIs are associated with the time domain locations of POs with reference to FIG. 19 and FIG. 20. FIG. 19 illustrates a schematic diagram of time domain locations of PEIs and time domain locations of POs according to an embodiment of the disclosure; FIG. 20 illustrates a schematic diagram of time domain locations of PEI and time domain locations of POs according to an embodiment of the disclosure.

Optionally, the time domain location of a PEI is determined by the time domain location of the first PO in multiple POs indicated by the PEI, that is, the time domain location of the PEI is associated with the time domain location of the first PO in corresponding multiple POs. Further, the end location of the PEI is determined by the start location of the first PO in corresponding multiple POs. As shown in FIG. 19, the end location of a PEI is a location with an eighth interval apart and before the start location of the first PO among the corresponding multiple POs, and the eighth interval is a predefined or preconfigured value or a value reported by the UE to the base station, and the eighth interval may include the processing time for receiving a PEI and/or the preparation time for monitoring the corresponding PO by the UE. Here, the start location of a PO is the start location of the first PDCCH monitoring occasion of the PO or the start location of the slot where the first PDCCH monitoring occasion of the PO is located. The end location of the PEI is the end location of the PEI of the last beam direction or the end location of the slot where the PEI of the last beam direction is located. The locations of other PEIs except for the PEI of the last beam direction among the PEIs of the S beam directions are determined by the location of the PEI of the last beam direction.

Optionally, as shown in FIG. 20, the interval between the end location of the PEI of the first beam direction and the start location of the first PO in corresponding multiple POs is the ninth interval. The UE determines the end location of the PEI of the first beam direction according to the ninth interval and the start location of the first PO, and then determines the locations of other PEIs according to the location of the PEI of the first beam direction. For example, PEIs of S beam directions are consecutive. Here, the start location of a PO can be the start location of the first PDCCH monitoring occasion of the PO or the start location of the slot where the first PDCCH monitoring occasion of the PO is located. The ninth interval is a predefined or preconfigured value or a value reported by the UE to the base station. For example, the ninth interval may include at least one of the processing time for receiving the indication information and the preparation time for receiving the PO by the UE.

Optionally, the time domain location of the PEI of the K-th beam direction is determined by the time domain location of the K-th PDCCH monitoring occasion of the first PO in the corresponding multiple POs, that is, the time domain location of the PEI of the K-th beam direction is associated with the time domain location of the K-th PDCCH monitoring occasion of the first PO in the corresponding multiple POs. Further, the end location of the PEI of the K-th beam direction is determined by the start location of the K-th PDCCH monitoring occasion of the first PO in the corresponding multiple POs. For example, the end location of the PEI of the K-th beam direction is a location with a tenth interval apart and before the K-th PDCCH monitoring occasion of the first PO in the corresponding multiple POs, and the tenth interval is a predefined or preconfigured value or a value reported by the UE to the base station. For example, the tenth interval may at least include the processing time for receiving a PEI and/or the preparation time for monitoring the corresponding PO by the UE.

It can be understood that the embodiments of the disclosure provide a variety of specific implementations in which the time domain locations of the PEIs can be associated with that of the POs. The time domain locations of the PEIs are determined by using the association relationship between the time domain locations of the PEIs and the time domain locations of the POs, which makes the determination of time domain locations of the PEIs more diversified and more accurate.

In the above example, there is only one time domain location for one PEI, that is, if the base station wants to send this PEI, it can only send this PEI at the corresponding location, and the UE should also detect this PEI at the corresponding location. However, considering the flexibility of scheduling resources for the base station, the base station can configure multiple possible PEI transmission locations, i.e., multiple candidate time domain locations of the PEI within a time window. For example, the base station can configure a transmission area of the PEI, e.g., a time window for possible transmission of the PEI, and UE can blindly detect all possible PEI transmission locations within the PEI transmission area.

Optionally, the system defines a time window for possible transmission of a PEI. The length of the time window can be predefined or preconfigured, or can be implicitly derived from the start location and the end location of the time window. There can be multiple possible transmission locations of a PEI in the time window, that is, multiple candidate time domain locations of the PEI in a time window. The base station selects at most one from all possible PEI transmission locations in the time window for transmitting a PEI, and the UE needs to detect the PEI in all possible PEI transmission locations in the time window. Similar to the example of determining the location of a PEI mentioned above, a similar method can be used to determine the location of the time window in which PEIs may be transmitted.

Figure 21:
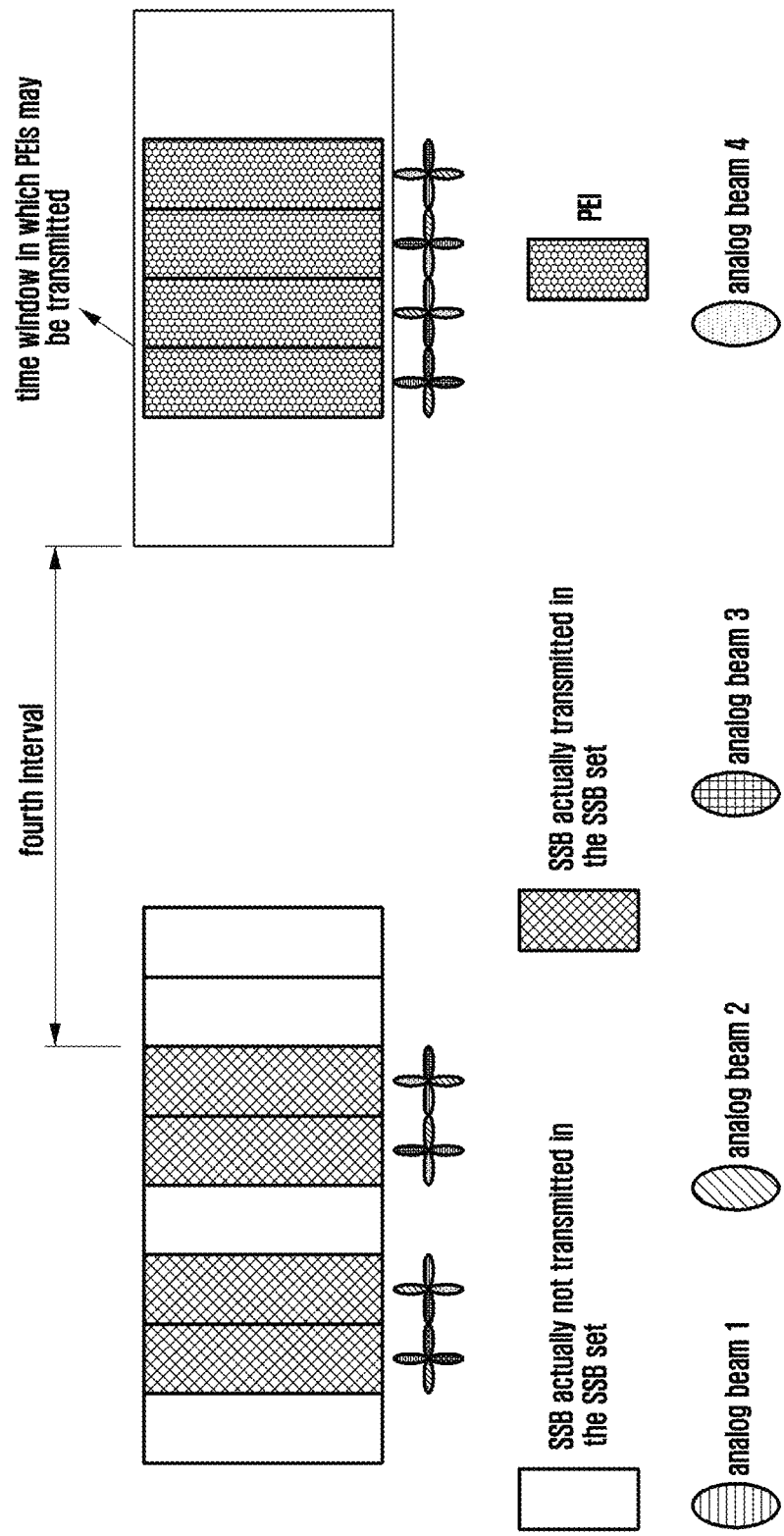
FIG. 21 illustrates a schematic diagram in which a time domain location of a time window in which PEIs may be transmitted is associated with locations of SSBs according to an embodiment of the disclosure.
Figure 22:
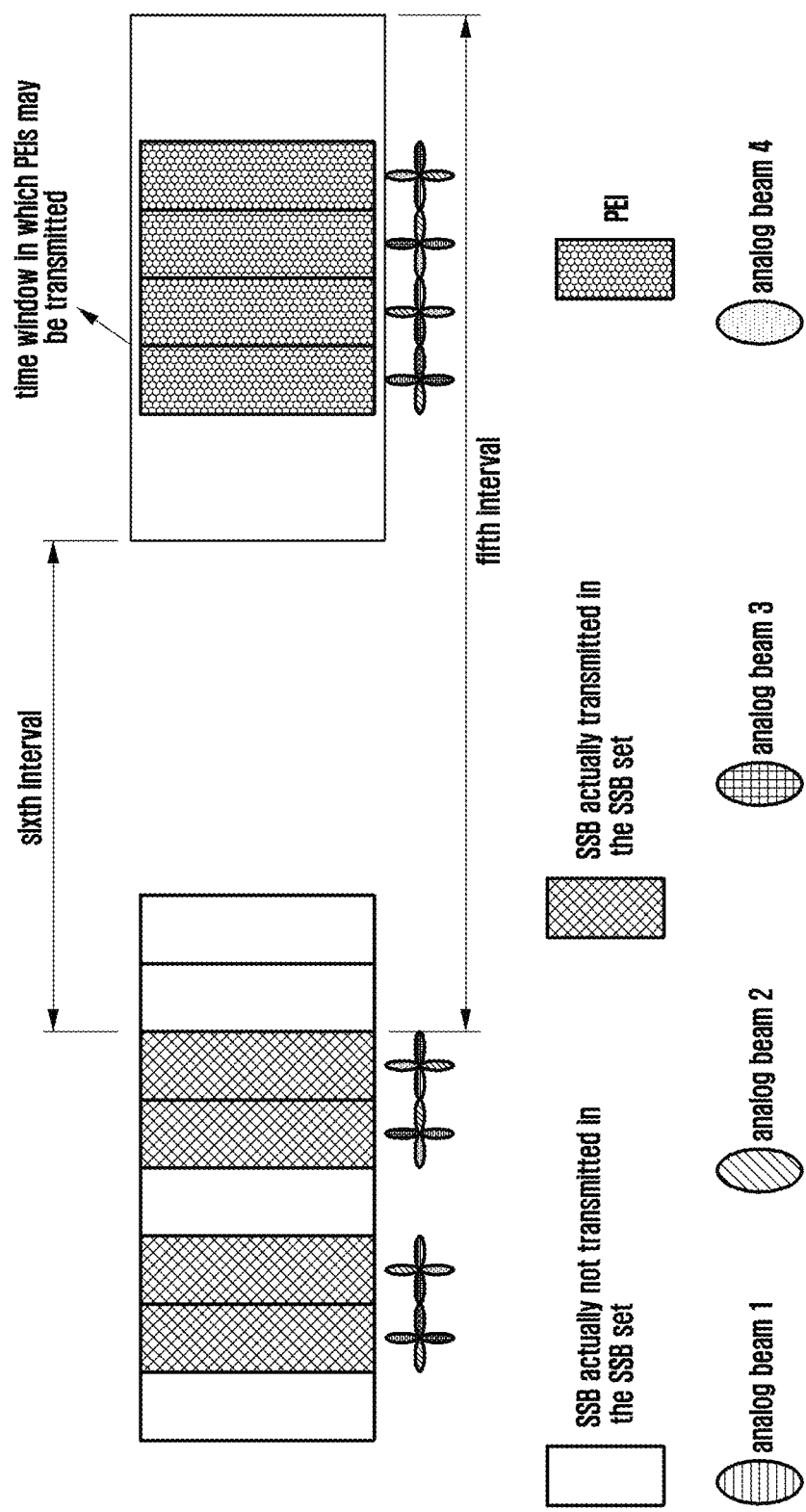
FIG. 22 illustrates a schematic diagram in which a time domain location of a time window in which PEIs may be transmitted is associated with locations of SSBs according to an embodiment of the disclosure.
Figure 23:
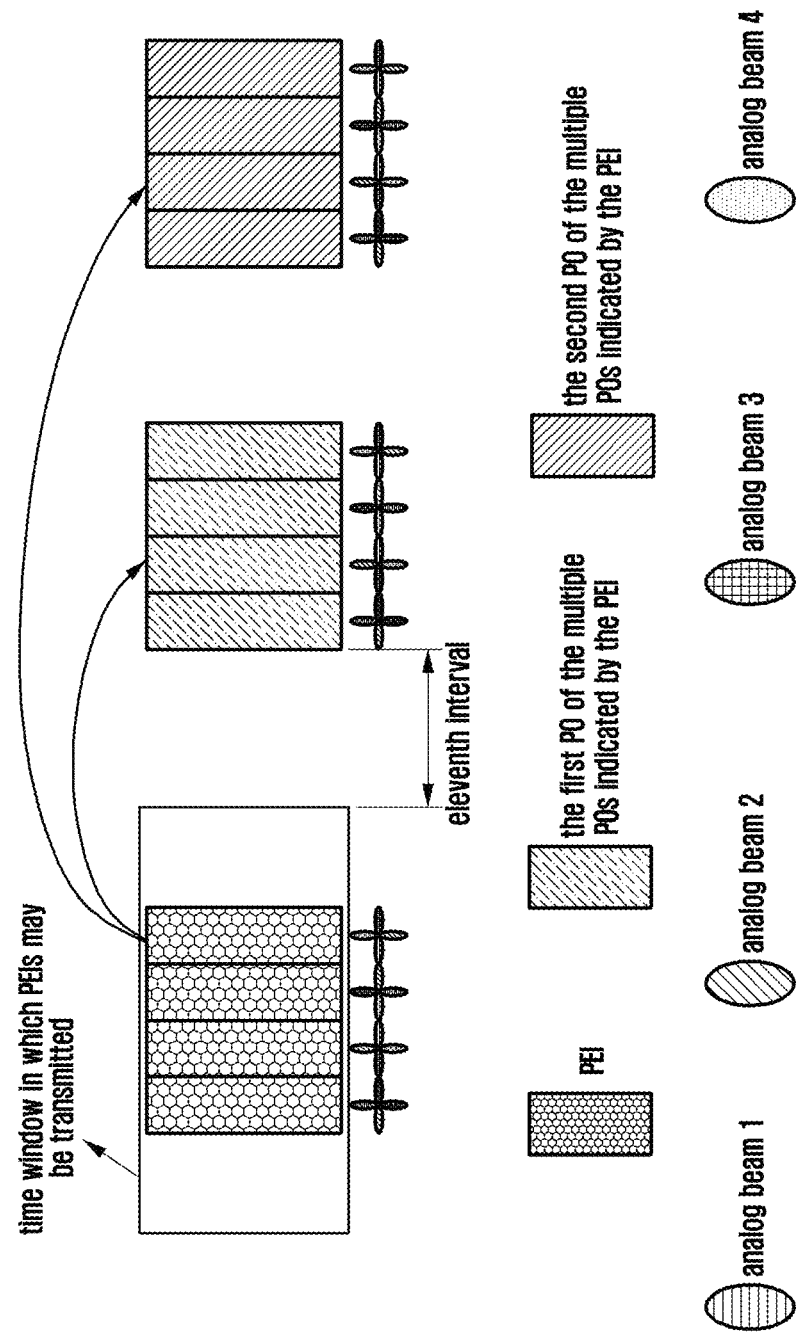
FIG. 23 illustrates a schematic diagram a time domain location of a time window in which PEIs may be transmitted is associated with locations of POs according to an embodiment of the disclosure.
Figure 24:
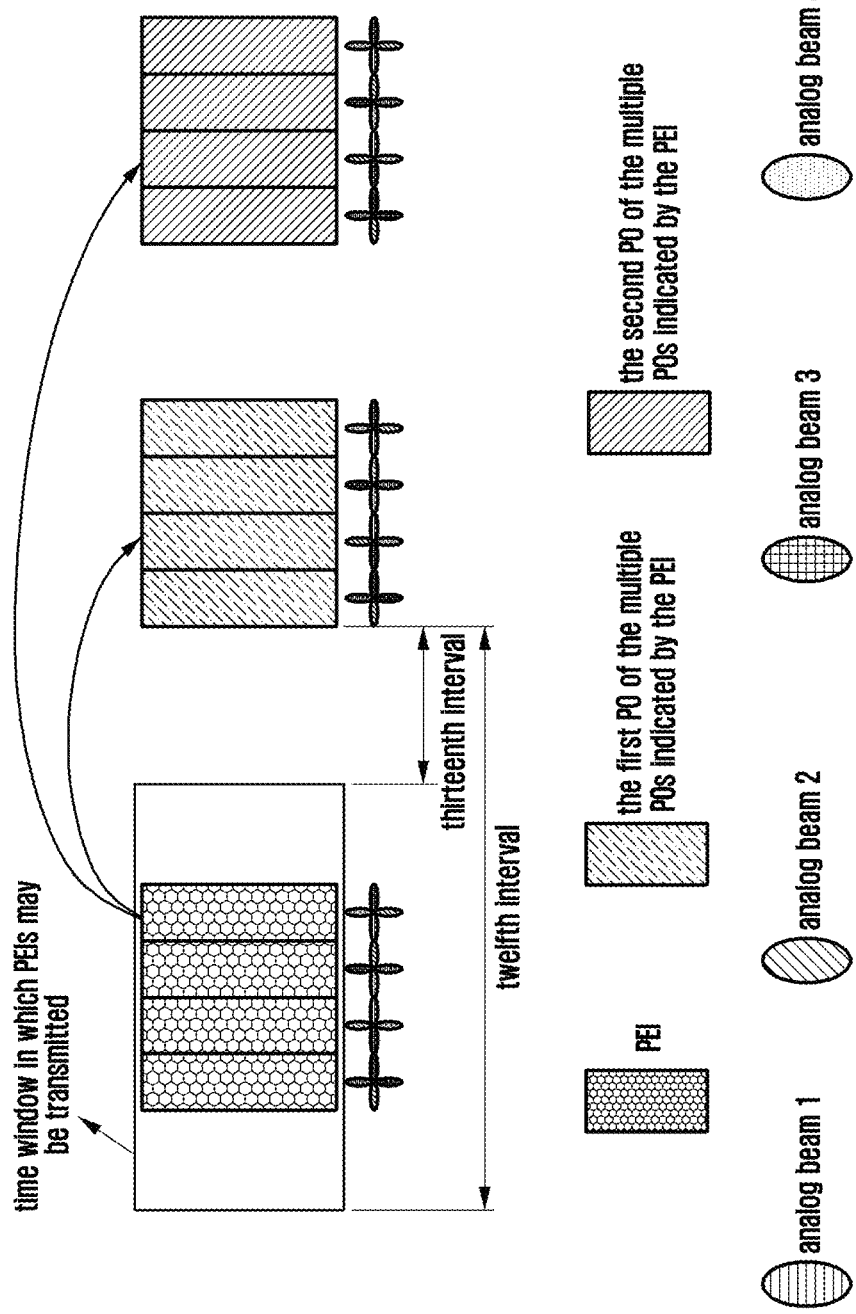
FIG. 24 illustrates a schematic diagram a time domain location of a time window in which PEIs may be transmitted is associated with locations of POs according to an embodiment of the disclosure.

The following will describe in detail a time window in which PEIs may be transmitted with reference to FIG. 21 to FIG. 24. FIG. 21 illustrates a schematic diagram in which a time domain location of a time window in which PEIs may be transmitted is associated with locations of SSBs according to an embodiment of the disclosure; FIG. 22 illustrates a schematic diagram in which a time domain location of a time window in which PEIs may be transmitted is associated with locations of SSBs according to an embodiment of the disclosure; FIG. 23 illustrates a schematic diagram a time domain location of a time window in which PEIs may be transmitted is associated with locations of POs according to an embodiment of the disclosure; FIG. 24 illustrates a schematic diagram a time domain location of a time window in which PEIs may be transmitted is associated with locations of POs according to an embodiment of the disclosure.

As shown in FIG. 21, the length of a time domain location of a time window in which PEIs may be transmitted is predefined or preconfigured, and the start location of the time window is determined by the end location of an SSB set. For example, there is a predefined or preconfigured fourth interval between the start location of the time window and the end location of an SSB set, which is the end location of the last SSB actually transmitted in the SSB set or the end location of the slot where the last SSB actually transmitted in the SSB set is located. The fourth interval may be a predefined or preconfigured value or a value reported by the UE to the base station.

As shown in FIG. 22, the length of the time window in which PEIs may be transmitted is implicitly derived from the start location and end location of the time window, which are both determined by the end location of an SSB set. For example, there is a sixth interval between the start location of the time window and the end location of the SSB set, and there is a fifth interval between the end location of the time window and the end location of the SSB set. The fifth and sixth intervals can be predefined or preconfigured values or values reported by the UE to the base station. For example, the fourth interval and the sixth interval may include at least one of processing time for receiving SSB and preparation time for receiving indication information by the UE, and the fifth interval may include at least one of processing time for receiving SSB, preparation time for receiving indication information by the UE and complete duration of indication information transmission.

As shown in FIG. 23, the length of the time window in which PEIs may be transmitted is predefined or preconfigured, and the end location of the time window is determined by the start location of the first PO among the multiple POs indicated by a PEI. For example, there is a predefined or preconfigured eleventh interval between the end location of the time window and the start location of the first PO. The eleventh interval may be a predefined or preconfigured value or a value reported by the UE to the base station. The start location of the first PO is the start location of the first PDCCH monitoring occasion of the PO or the start location of the slot where the first monitoring occasion of the PO is located.

As shown in FIG. 24, the length of the time window which PEIs may be transmitted is implicitly derived from the start time and end time of the time window, and the end location of the time window is determined by the start location of the first PO among the multiple POs indicated by a PEI. For example, there is a twelfth interval between the start location of the time window and the start location of the first PO, there is a thirteenth interval between the end location of the time window and the start location of the first PO, where the twelfth and thirteenth intervals can be predefined or preconfigured values, or values reported by the UE to the base station. For example, the eleventh interval and thirteenth interval may include at least one of processing time for receiving indication information and preparation time for receiving a PO by the UE, and the twelfth interval may include at least one of processing time for receiving indication information, preparation time for receiving a PO by the UE and complete duration of indication information transmission.

It can be understood that the embodiments of the disclosure provide a variety of specific implementations of multiple candidate time domain locations of PEI within a time window, by which the base station can schedule resources more flexibly, and the determination of time domain locations of the PEI is more diversified and more accurate.

As another implementation, the time domain location of a PEI is independent from the time domain locations of other channels/signals.

Optionally, the time domain location of a PEI is independently configured, that is, it is not associated with the time domain location of any other physical channel/signal. That is, the base station can configure a PEI at any location. The advantage of this method is that the system can flexibly determine the location of a PEI according to the network load condition, but the mapping relationship between a PEI and corresponding indicated PO needs to be defined additionally.

For example, assuming that a PEI indicates whether there is paging information on one PO, the system specifies that the latest PEI with the predefined or preconfigured interval apart and before a PO is the PEI corresponding to the PO, that is, the interval between a PEI and the corresponding PO should be greater than or equal to the predefined or preconfigured interval; assuming that a PEI indicates whether there is paging information on the PO corresponding to one PF, the system specifies that the latest PEI with the predefined or preconfigured interval apart and before the first PO corresponding to the PF is the PEI corresponding to the PF, that is, the interval between a PEI and the first PO of the corresponding PF should be greater than or equal to the predefined or preconfigured interval.

The following is a detailed description of the carrying mode of a PEI.

As an implementation, a PEI can be carried by a DCI.

Optionally, a PEI is carried by a DCI, that is, the base station carries a PEI by transmitting a PDCCH, and the terminal receives the PEI by monitoring the PDCCH. For example, the system defines a dedicated DCI for indicating a PEI, and the DCI contains at least one of the following indication fields:

(1) M-bit bitmap information for indicating whether there is a paging message to be transmitted on each PO in a plurality of POs, that is, each bit in the bitmap corresponds to one PO, with an indication value of 0 indicating that there is no paging message to be transmitted on the PO and an indication value of 1 indicating that there is a paging message to be transmitted on the PO;

(2) a short message for indicating paging messages on the radio access network (RAN) side (the definition of short message in Section 6.5 of 38.331 is incorporated herein by reference), including the following information:

a) 1-bit information for indicating the change of system information, sy stemInfoModification;

b) 2-bit information for indicating ETWS and/or CMAS, etwsAndCmasIndication.

In an example, the DCI carrying a PEI contains any one of the above bitmap information and the above short message, that is, it contains either the above bitmap information or the short message indicating the above, and the DCI should also contain 1-bit information for indicating which of the above two kinds of information is contained, as shown in the following table 2:

TABLE 2

| 1-bit field | Flag indicator |
| --- | --- |
| 0 | Containing bitmap information |
| 1 | Containing a short message |

In another example, the DCI carrying a PEI contains at least one of the above bitmap information and the above short message, i.e., it may contain M-bit bitmap information for indicating whether there is a paging message to be transmitted on each PO of a plurality of POs, or it may only contain a short message for indicating a paging message on the radio access network (RAN) side, or it may contain both bitmap information and a short message. In addition, the DCI should also contain 2 bits for indicating which information it contains, as shown in the following table 3:

TABLE 3

| 2-bit field | Flag indicator |
| --- | --- |
| 00 | Reserved value |
| 01 | Containing only bitmap information |
| 10 | Containing only a short message |
| 11 | Containing both bitmap information and a short message |

It can be understood that the embodiments of the disclosure provide a variety of specific implementations of a DCI carrying a PEI, so that the DCI carrying a PEI is more diverse, which can be flexibly selected and used by the base station according to needs, and when indicated by a 1-bit field, it can further save system overhead and reduce system power consumption.

Optionally, the above DCI carrying a PEI can scramble a CRC with the same RNTI value as the PDCCH for scheduling paging messages, that is, the P-RNTI (the corresponding hexadecimal value is fixed as FFFE) is used to scramble the CRC.

Optionally, the above DCI carrying a PEI can scramble the CRC with a RNTI value fixed with a whole network fixed RNTI value different from that of the PDCCH used for scheduling paging messages, and the whole network uses a fixed RNTI value similar to P-RNTI used for paging messages and SI-RNTI used for system information. For example, the above PDCCH carrying a PEI uses PEI-RNTI (the corresponding hexadecimal value is fixed as EEFD) to scramble the CRC.

The above DCI carrying a PEI is similar to other broadcast channels (such as SIB1, other system information, paging information, random access response, etc.), and its CORESET and search space can be configured in the downlink initial BWP through SIB1. The system can specify that the DCI carrying a PEI and the PDCCH for scheduling paging information use the same search space, that is, paging search space (pagingSearchSpace); or, the system may configure a dedicated search space for the DCI carrying a PEI, such as PEI search space (PEISearchSpace).

As mentioned above, the base station can transmit indication information of S beam directions by beam sweeping, indication information of S beam directions corresponds to S SSBs actually transmitted in one SSB set cycle, respectively. If the PEI is carried by a DCI, the PEI should have at least S PDCCH monitoring occasions. In addition, the parameter nrofPDCCH-MonitoringOccasionPerSSB-InPEI similar to the PO can be introduced to configure the number of PDCCH motoring occasions contained in the PEI corresponding to each SSB.

When the parameter nrofPDCCH-MonitoringOccasion-PerSSB-InPEI=1, one PEI contains S PDCCH monitoring occasions, where the K-th PDCCH monitoring occasion of a PEI corresponds to the K-th SSB actually transmitted in an SSB set, K=1, 2, . . . , S; when the parameter nrofPDCCH-MonitoringOccasionPerSSB-InPEI=X, one PEI contains S*X monitoring occasions, where the (x*S+K)th PDCCH monitoring occasion of a PEI corresponds to the K-th SSB actually transmitted in an SSB set, where x=0, 1, . . . , X−1, K=1, 2, . . . , S.

The method for determining PDCCH monitoring occasions of a PO in the existing system can be reused to determine the PDCCH monitoring occasions of a PEI. For example, the location of the start slot or end slot of a PEI can be determined by the above method for determining the time domain location of a PEI. If the location of the start slot of a PEI can be determined, the first PDCCH monitoring occasion determined by PEI search space in the start slot is the first PDCCH monitoring occasion of the PEI, and the PDCCH monitoring occasions included in the PEI can be determined by counting backward in turn. If the location of the end slot of a PEI can be determined, then the last PDCCH monitoring occasion determined by the PEI search space in the end slot is the last PDCCH monitoring occasion contained in the PEI, and the PDCCH monitoring occasions contained in the PEI can be determined by deriving forward.

As an implementation, a PEI can be carried by M predefined or preconfigured physical layer sequence signals, and each physical layer sequence signal corresponds to one of the M POs.

Optionally, a PEI can be carried by predefined or preconfigured physical layer sequence signals, that is, the base station carries the PEI by transmitting physical layer sequence signals, and the terminal receives the PEI by receiving physical layer sequence signals. For example, the base station indicates 1-bit information by whether to transmit physical layer sequence signals. If the UE detects a sequence signal on the transmission resources of a PEI, it means that there is a paging message to be transmitted on the corresponding PO, and the UE should monitor the corresponding PO. If the UE does not detect the sequence signal on the transmission resources of the PEI, it means that there is no paging message to be transmitted on the corresponding PO, and the UE can skip the corresponding PO; or, if the UE detects the sequence signal on transmission resources of the PEI, it means that there is no paging message to be transmitted on the corresponding PO, and the UE can skip the corresponding PO, if the UE does not detect the sequence signal on transmission resources of the PEI, it means that there is a paging message to be transmitted on the corresponding PO, and the UE should monitor the corresponding PO.

As mentioned above, the PEI can indicate whether there is a paging message to be transmitted on each PO of a plurality of POs, so the information carried by the PEI should be greater than 1 bit. Because one physical layer sequence signal can carry at most 1 bit, the PEI can be carried by a plurality of predefined or preconfigured physical layer sequence signals, for example, each physical layer sequence signal corresponds to one PO, and these physical layer sequence signals can use different time domain resources, that is, time division multiplexing (TDM); or, these multiple physical layer sequence signals can use different frequency domain resources, that is, frequency division multiplexing (FDM); or, the multiple physical layer sequence signals can use different code domain resources, that is, code division multiplexing (CDM); or, the multiple physical layer sequence signals can be multiplexed by a mixed way of TDM, FDM, CDM and single sequence code division multiplexing.

Particularly, a plurality of physical layer sequence signals used for indicating the PEI can be multiplexed by single sequence CDM division multiplexing, that is, the plurality of physical layer sequence signals share the same time-frequency resources, and considering the limitation of the total maximum transmission power of the base station, the base station can transmit at most one PEI sequence signal on this time-frequency resource, and the PEI sequence signals possibly transmitted by the base station belong to a predefined or preconfigured PEI sequence signal set, and the UE blindly detects PEI sequence signals on this time-frequency resource based on the sequence signal set. For example, assuming that the PEI indicates whether there is paging information transmission on two consecutive POs, the PEI sequence signal set may contain four CDM sequences for indicating four status values, namely: there is a paging message to be transmitted on both POs, there is no paging message to be transmitted on both POs, there is a paging message to be transmitted on the first PO and there is no paging message to be transmitted on the second PO, there is no paging message to be transmitted on the first PO and there is a paging message to be transmitted on the second PO.

It can be understood that the embodiment of the disclosure provides a specific implementation of physical layer sequence signals carrying a PEI, and provides a multiplexing mode of the above-mentioned multiple physical layer sequence signals, so that time domain resources, frequency domain resources and code domain can be multiplexed, which can further save system resources, and the base station can select different multiplexing modes according to the need, making the configuration of the base station more flexible.

Furthermore, whether the PEI is carried by DCI or physical layer sequence signals, the base station may or may not transmit the PEI. If the UE does not monitor the PEI, the corresponding action of the UE may be predefined or preconfigured.

Optionally, the action when the UE does not monitor the PEI is predefined. For example, the system specifies that the UE skips the corresponding PO, that is, it can directly enter the deep sleep state; or, the system specifies that the UE continues to monitor the corresponding PO.

Optionally, the action when the UE does not monitor the PEI is configurable. For example, the system can configure the UE to continue to monitor the corresponding PO, or configure the UE to skip the corresponding PO.

In addition, it can be known from the calculation formula for determining the PF and PO mentioned above that several UEs may be corresponding to the same PO of the same PF. Among these UEs, if one UE is paged by the core network, the PEI needs to indicate that there is a paging message to be transmitted on this PO. Correspondingly, several UEs monitoring this PO need to monitor the corresponding PO according to the indication of the PEI, but in fact only the really paged UE needs to monitor the corresponding PO. The paged UE will initiate responses such as random access after monitoring the PO, while the other UEs will switch to a sleep state after monitoring PO, that is, the other UE may not monitor the corresponding PO.

In order to reduce the probability of the UE being awakened by paging information for other UE and further reduce the power consumption of the UE, several UEs monitoring the same PO can be grouped, and different UE groups correspond to different PEIs, which is similar to the UE-group WUS in the existing LTE IOT (including NB-IOT and eMTC) system. This concept of UE grouping is also applicable to the above PEIs. The grouping mode of UEs can reuse the method in LTE IOT, that is, grouping UEs by UE_ID; or, grouping UEs by paging probability; or, the UEs are grouped with two layers by UE_ID and paging probability. In this case, UE_ID=5G-S-TMSI mod 1024, where TMSI (temporary mobile subscriber identify) is the temporary mobile subscriber identity of the UE, which can be used to uniquely distinguish different UEs; paging probability is configured to the UE by the core network.

As an implementation, a plurality of UEs monitoring the same PO are divided into N UE groups, and the PEI is used to indicate whether there is a paging message to be transmitted to the N UE groups on the M POs.

The following is a detailed description of the PEI carrying mode when UEs are grouped with reference to FIGS. 25 to 28.

Figure 25:
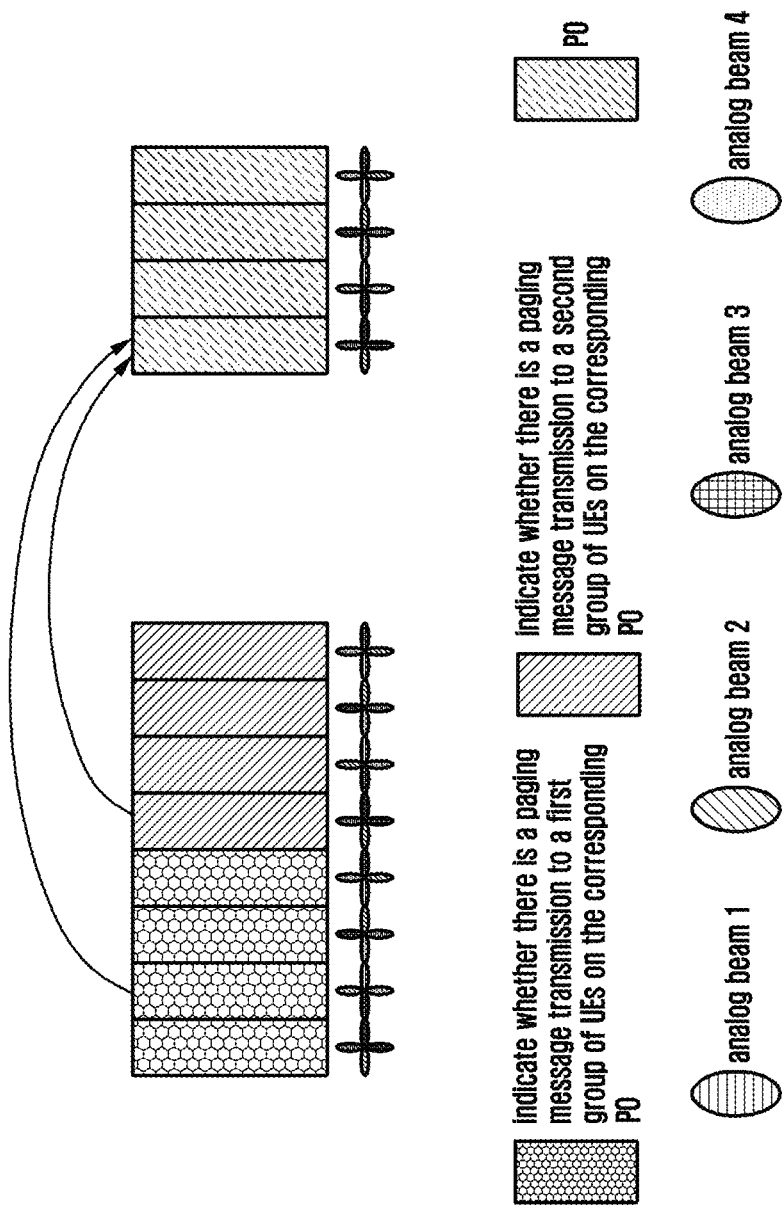
FIG. 25 illustrates a schematic diagram of a time division multiplexing mode between different UE group PEIs according to an embodiment of the disclosure.
Figure 26:
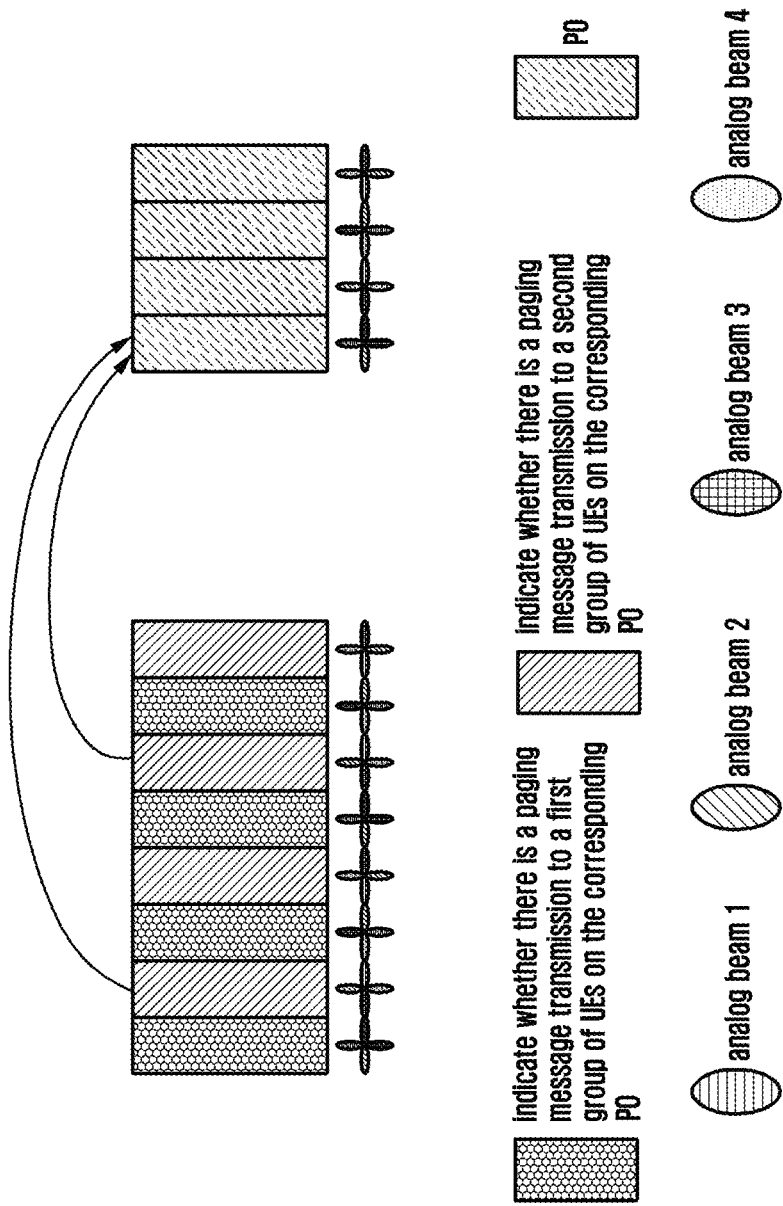
FIG. 26 illustrates a schematic diagram of a time division multiplexing mode between different UE group PEIs according to an embodiment of the disclosure.
Figure 27:
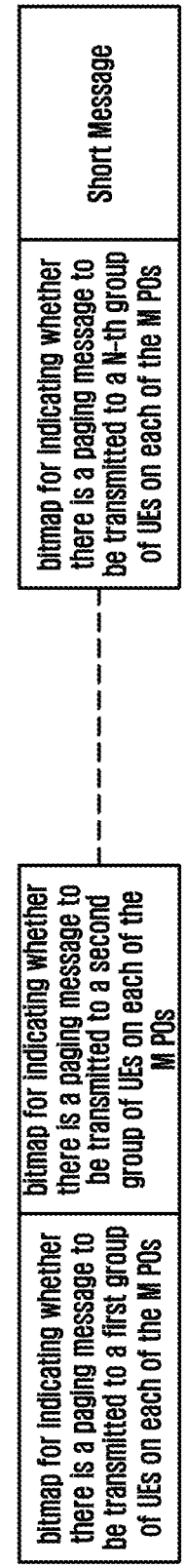
FIG. 27 illustrates a schematic diagram of DCI carrying a UE group PEI according to an embodiment of the disclosure.
Figure 28:
FIG. 28 illustrates a schematic diagram of DCI carrying a UE group PEI according to an embodiment of the disclosure.

FIG. 25 illustrates a schematic diagram of a time division multiplexing mode between different UE group PEIs according to an embodiment of the disclosure; FIG. 26 illustrates a schematic diagram of a time division multiplexing mode between different UE group PEIs according to an embodiment of the disclosure; FIG. 27 illustrates a schematic diagram of DCI carrying a UE group PEI according to an embodiment of the disclosure; FIG. 28 illustrates a schematic diagram of DCI carrying a UE group PEI according to an embodiment of the disclosure.

Optionally, a PEI indicates whether there is a paging message to be transmitted on a PO and is carried by one physical layer sequence signal, and the UE group PEI can be multiplexed by M*N predefined or preconfigured physical layer sequence signal bearers in a time division multiplexing TDM manner, and each physical layer sequence signal corresponds to one of the N UE groups and one of the M POs, respectively. For example, time division multiplexing can be realized by at least one of the following ways: the transmission of different beam directions of each UE group PEI is consecutive in time; or the transmission of the same beam direction of different UE group PEI is consecutive in time.

Specifically, because a PEI contains the transmission of S beam directions (the transmission of S beam directions included in the PEI is the PEI of S beam directions transmitted by the base station through beam sweeping, which can be used interchangeably in this paper), there are two ways for the TDM of multiple UE group PEIs. Assuming that several UEs corresponding to the same PO are divided into N groups, the UE group PEIs as a whole contain the PEI transmission of N*S beam directions. In the first mode, the transmission of the PEI of each UE group of S beam directions is continuous, and the PEI transmission of ((n−1)*S+1)th~n*S-th beam directions correspond to the transmission of S beam directions contained in the PEI of the n-th UE group, that is, the ((n−1)*S+K)th PEI corresponds to the K-th SSB, n=1, 2, . . . , N, K=1, 2, . . . , S; in the second mode, the transmission of S beam directions of PEIs of different UE groups are crossed, and the (n, N+n, 2N+n, (S−1)*N+n)-th PEI transmission correspond to the transmission of S beam directions contained in the PEI of n-th UE group, that is, the ((K−1)*N+n)-th PEI corresponds to the K-th SSB, n=1, 2, . . . , N, K=1, 2, . . . , S.

As shown in FIG. 25, the transmission in S beam directions included in both the PEI corresponding to the first group of UEs and the PEI corresponding to the second group of UEs is continuous, that is, the base station first transmits the transmission of S beam directions of the PEI corresponding to the first group of UEs, and then transmits the transmission of S beam directions of the PEI corresponding to the second group of UEs. The indication information of the PEI corresponding to the first group of UEs may be the same as or different from that of the PEI corresponding to the second group of UEs, and the transmission in S beam directions included in the same PEI all carries the same information, indicating that the analog beams for transmission may be different. Here, the transmission time for PEIs of different UE groups has an order.

As shown in FIG. 26, the transmission in S beam directions included in both the PEI corresponding to the first group of UEs and the PEI corresponding to the second group of UEs is crossed, that is, for the same analog beam direction, the base station sequentially transmits the PEI of different UE groups, and transmits the PEI of the next analog beam direction after transmitting the PEIs of all UE groups, and so on. Thereafter, the base station first transmits the transmission of S beam directions of the PEI corresponding to the first group of UEs, and then transmits the transmission of S beam directions of the PEI corresponding to the second group of UEs. The indication information of the PEI corresponding to the first group of UEs may be the same as or different from that of the PEI corresponding to the second group of UEs, and the transmission of S beam directions included in the same PEI all carries the same information, indicating that the analog beams for transmission may be different. Here, the transmission time of PEIs of different UE groups can be considered as equivalent.

Optionally, the UE group PEI is carried by a dedicated DCI format, and the DCI format may contain a plurality of bit blocks, which are respectively used to indicate to different UE groups whether there is a paging message to be transmitted on each PO of a plurality of POs. It is assumed that several UEs corresponding to the same PO are divided into N groups, and a PEI indicates for M POs. As shown in FIG. 27, the DCI format indicating a UE group PEI can contain N bit blocks with size of M bits, and each bit block indicates whether there is a paging message to be transmitted to on UE group on each PO of the M POs in a form of bitmap. In addition, the DCI can also contain short messages.

Optionally, the UE group PEI is carried by a dedicated DCI format, and the DCI format may contain a plurality of bit blocks, which are respectively used to indicate to a plurality of UE groups whether there is a paging message to be transmitted on a PO of a plurality of POs. It is assumed that several UEs corresponding to the same PO are divided into N groups, and the PEI indicates for M POs. As shown in FIG. 28, the DCI format indicating a UE group PEI may contain M bit blocks with size of N bits, and each bit block indicates whether there is a paging message to be transmitted to the N UE groups on a PO of the M POs in a form of bitmap. In addition, the DCI can also contain short messages.

Optionally, the PEIs include N independent PEIs, each PEI is used to indicate to one UE group whether there is a paging message to be transmitted on M POs, and the N PEIs are multiplexed by time division multiplexing and/or frequency division multiplexing; or PEIs include M independent PEIs, each PEI is used to indicate to N UE groups whether there is a paging message to be transmitted on a PO of M POs, and the M PEIs are multiplexed by time division multiplexing and/or frequency division multiplexing; among them, M or N PEIs are time division multiplexed by at least one of the following ways: the transmission in different beam directions of each PEI is consecutive in time; or the transmission in the same beam direction of different PEIs is consecutive in time.

Furthermore, if the cell where the UE resides changes after monitoring the PEI, no matter what information the PEI indicates, the UE needs to monitor the remaining POs indicated by the PEI in the new residential cell, that is, the information indicated by the PEI only acts on the POs of the current cell.

It can be understood that by grouping a plurality of UEs, the probability of a UE being awakened by paging information of other UEs can be further reduced, so as to further reduce the power consumption of the UE, and a plurality of concrete implementations of PEI carrying modes when UEs are grouped are provided, and multiplexing modes of the PEI carrying modes are provided, so that time domain resources, frequency domain resources and code domain can be multiplexed, which can further save system resources, and the base station can select different multiplexing modes according to the need, making the configuration of the base station more flexible.

In another example, in order to avoid waking up all UEs corresponding to one PO, the probability of receiving unnecessary paging PDSCH can be reduced by paging the UEs in groups. For example, all UEs corresponding to one PO are divided into N groups according to predefined rules, and the simplest method is to group them according to the TMSI ID of the UEs. For example, the index (Group ID) of the UE group can be calculated by modulo N by TMSI ID, that is, Group_ID=TMSI_ID % N. The base station can wake up any group of N UE groups to receive paging PDSCH, while other non-awakened UEs does not need to wake up to receive paging PDSCH, thus achieving the purpose of saving power for the UE.

Optionally, the system realizes group paging by scrambling paging PDCCHs with multiple P-RNTI values, that is, the base station transmits paging PDCCHs scrambled with different P-RNTI values for each UE group respectively, and the base station can wake up any one or more of N UE groups, and the scheduling information contained in these group paging PDCCHs can address to the same paging PDSCH. The system predefines or preconfigures (indicated by system information) the corresponding P-RNTI value for each UE group. Considering the forward compatibility with legacy UEs of the existing system, the P-RNTI value corresponding to grouped UE cannot reuse the P-RNTI value (i.e., FFFE) of the existing system.

If the base station wants to wake up N UE groups at the same time, the base station needs to transmit N paging PDCCHs scrambled with different P-RNTI values on the same PO, and the signaling overhead will be a problem. To save the signaling overhead, the concept of a common P-RNTI value can be introduced, that is, a common paging PDCCH scrambled with a common P-RNTI value can be transmitted to wake up N UE groups at the same time, without scrambling and transmitting multiple group paging PDCCHs with individual P-RNTI values for each UE group. From the perspective of a UE, it is necessary to simultaneously monitor PDCCHs scrambled with P-RNTI values of the UE group that the UE belongs to and PDCCHs scrambled with the common P-RNTI value. As long as any one of these two PDCCHs is monitored, it is necessary to continue to receive paging PDSCH. If neither PDCCH is monitored, it can enter the sleep state.

Including a common P-RNTI value, the system needs to predefine or preconfigure N+1 P-RNTI values for N UE groups, wherein the common P-RNTI value can use the P-RNTI value of the existing system (i.e., FFFE) by default; or, a P-RNTI value different from that of the existing system can be used; or, it is configured to use the P-RNTI value of the existing system or a P-RNTI value different from that of the existing system.

Optionally, the system realizes group paging by using multiple time domain/frequency domain resources, that is, the base station transmits paging PDCCHs on different time domain/frequency domain resources for N UE groups, and the base station can wake up any one or more of the N UE groups, and the scheduling information contained in these group paging PDCCHs can address to the same paging PDSCH. Considering the forward compatibility with legacy UEs of the existing system, the system information not only indicates the time domain/frequency domain resources for legacy UEs to monitor POs, but also needs to additionally configure (indicate by the system information) the corresponding time domain/frequency domain resources for monitoring the paging PDCCH for each UE group.

If the base station wants to wake up N UE groups at the same time, the base station needs to transmit multiple group paging PDCCHs on multiple time domain/frequency domain resources at the same time, so signaling overhead will be a problem. To save signaling overhead, the concept of common time domain/frequency domain resources can be introduced, that is, to wake up N UE groups at the same time by transmitting a common paging PDCCH on the common time domain/frequency domain resources, without transmitting multiple group paging PDCCHs on the corresponding time domain/frequency domain resources for each UE group respectively. From the perspective of the UE, it is necessary to monitor paging PDCCHs on both time domain/frequency domain resources of the UE group that the UE belongs to and the common time domain/frequency domain resources. As long as paging PDCCHs are monitored on any one of these two resources, it is necessary to continue to receive paging PDSCH. If paging PDCCHs are not monitored on these two resources, it can enter the sleep state.

Including common time domain/frequency domain resources, the system needs to configure N+1 time domain/frequency domain resources for monitoring paging PDCCHs for N UE groups, and considering the forward compatibility with legacy UEs of the existing system, the time domain/frequency domain resources for monitoring the common paging PDCCH can use the same resources as legacy UEs by default; or, resources different from that of the legacy UEs can be used; or, it is configured to use resources of legacy UEs or resources different from that of legacy UEs.

The above concept of common paging PDCCH proposed for UE group paging PDCCH can also be applied to wake up multiple UE groups corresponding to this PO at the same time, instead of waking up all UE groups corresponding to this PO at the same time, so as to make a better compromise between saving system signaling overhead and reducing the probability of waking up unnecessary UE groups. This common paging PDCCH can be called group common paging PDCCH. For example, in N UE groups, every G UE groups can correspond to a group common paging PDCCH. If the base station transmits the group common paging PDCCH, that is, to wake up G UE groups corresponding to this PO to receive the scheduled paging PDSCH. Each UE not only monitors the group paging PDCCH corresponding to the UE group to which it belongs, but also monitors the group common paging PDCCH corresponding to the UE group to which it belongs, or may also monitor the common paging PDCCH.

It can be understood that the above specific implementations can be combined with each other to form various new embodiments, and all the embodiments formed belong to the protection scope of this disclosure, and each step can be added and omitted as required, and the formed embodiments belong to the protection scope of this disclosure.

FIG. 29 illustrates a flowchart of a method performed by a base station according to an embodiment of the disclosure. The method includes step S510.

In step S510, transmit indication information to the user equipment, where the indication information is used to indicate whether there is a paging message to be transmitted on M POs.

Herein, each PO in the M POs corresponds to a plurality of UEs, and M>1.

It can be understood that the above-mentioned method performed by the base station is an implementation on the base station side corresponding to the above-mentioned method performed by the UE, and one can refer to the description corresponding to the above-mentioned method performed by the UE for its specific implementation details, which will not be repeated here.

In the above method, the base station transmits indication information to the user equipment, the indication information indicating whether there is a paging message to be transmitted on M POs, wherein each PO in the M POs corresponds to a plurality of UEs, respectively, M>1, such that the UE can determine whether to monitor the corresponding PO in the M POs based on the received indication information, by which the base station is enabled to indicate to the UE in advance whether there is a paging message to be transmitted on M POs by transmitting indication information to the user equipment, so that the UE does not need to monitor the corresponding PO, and further reduces the power consumption of the UE.

Figure 30:
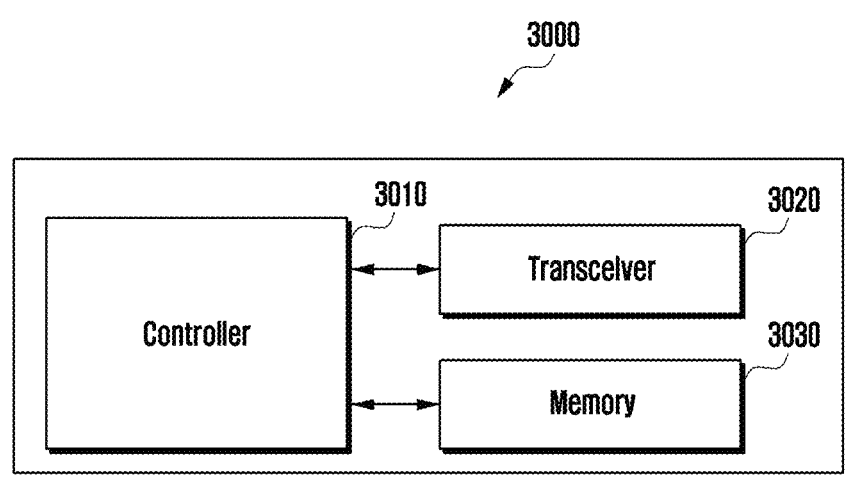
FIG. 30 illustrates a block diagram showing a structure of a user equipment according to an embodiment of the disclosure.

FIG. 30 is a block diagram showing a structure of a UE according to an embodiment of the disclosure.

Referring to FIG. 30, the UE 3000 may include a controller 3010, a transceiver 3020 and a memory 3030. However, all of the illustrated components are not essential. The UE 3000 may be implemented by more or less components than those illustrated in FIG. 30. In addition, the controller 3010 and the transceiver 3020 and the memory 3030 may be implemented as a single chip according to another embodiment.

The UE 3000 may correspond to the UE described above. For example, the UE 3000 may correspond to the UE in FIG. 3A.

The aforementioned components will now be described in detail.

The controller 3010 may include one or more processors or other processing devices that control the proposed function, process, and/or method. Operation of the UE 3000 may be implemented by the controller 3010.

The transceiver 3020 may include an RF transmitter for up-converting and amplifying a transmitted signal, and an RF receiver for down-converting a frequency of a received signal. However, according to another embodiment, the transceiver 3020 may be implemented by more or less components than those illustrated in components.

The transceiver 3020 may be connected to the controller 3010 and transmit and/or receive a signal. The signal may include control information and data. In addition, the transceiver 3020 may receive the signal through a wireless channel and output the signal to the controller 3010. The transceiver 3020 may transmit a signal output from the controller 3010 through the wireless channel.

The memory 3030 may store the control information or the data included in a signal obtained by the electronic device 3000. The memory 3030 may be connected to the controller 3010 and store at least one instruction or a protocol or a parameter for the proposed function, process, and/or method. The memory 3030 may include read-only memory (ROM) and/or random access memory (RAM) and/or hard disk and/or CD-ROM and/or DVD and/or other storage devices.

Figure 31:
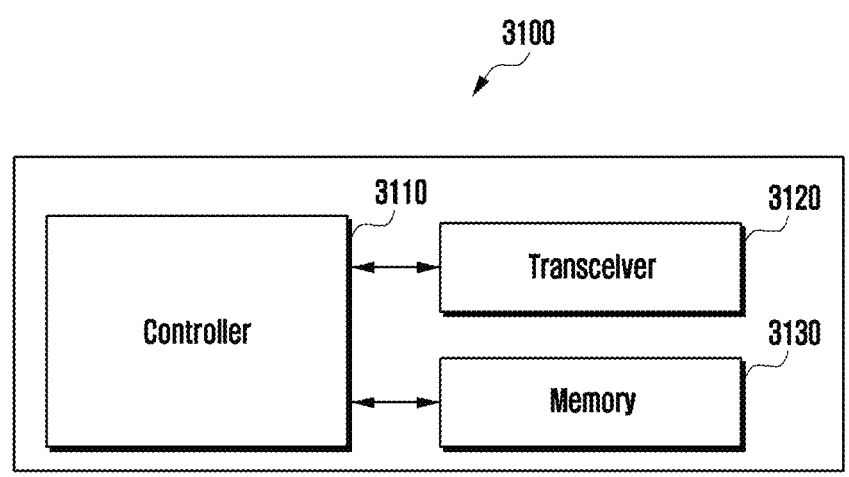
FIG. 31 illustrates a block diagram showing a structure of a base station according to an embodiment of the disclosure.

FIG. 31 is a block diagram showing the structure of a base station according to an embodiment of the disclosure.

Referring to FIG. 31, the base station 3100 may include a controller 3110, a transceiver 3120 and a memory 3130. However, all of the illustrated components are not essential. The base station 3100 may be implemented by more or less components than those illustrated in FIG. 31. In addition, the controller 3110 and the transceiver 3120 and the memory 3130 may be implemented as a single chip according to another embodiment.

The base station 3100 may correspond to the gNB described in the disclosure. For example, the base station 3100 may correspond to the gNB in FIG. 3B.

The aforementioned components will now be described in detail.

The controller 3110 may include one or more processors or other processing devices that control the proposed function, process, and/or method. Operation of the base station 3100 may be implemented by the controller 3110.

The transceiver 3120 may include an RF transmitter for up-converting and amplifying a transmitted signal, and an RF receiver for down-converting a frequency of a received signal. However, according to another embodiment, the transceiver 3120 may be implemented by more or less components than those illustrated in components.

The transceiver 3120 may be connected to the controller 3110 and transmit and/or receive a signal. The signal may include control information and data. In addition, the transceiver 3120 may receive the signal through a wireless channel and output the signal to the controller 3110. The transceiver 3120 may transmit a signal output from the controller 3110 through the wireless channel.

The memory 3130 may store the control information or the data included in a signal obtained by the base station 3100. The memory 3130 may be connected to the processor 3110 and store at least one instruction or a protocol or a parameter for the proposed function, process, and/or method. The memory 3130 may include read-only memory (ROM) and/or random access memory (RAM) and/or hard disk and/or CD-ROM and/or DVD and/or other storage devices.

At least one embodiment of the disclosure also provides a non-transitory computer-readable recording medium having stored thereon a program, which when performed by a computer, performs the methods described above.

According to one aspect of the disclosure, there is provided a method performed by the UE comprising the following steps: receiving indication information, wherein the indication information is used to indicate whether there is a paging message to be transmitted on M POs in one paging cycle, and M>1; determining whether to monitor a corresponding PO in the M POs based on the received indication information.

According to the method performed by the UE provided by the disclosure, the M POs are consecutive.

According to the method performed by the UE provided by the disclosure, the indication information is used to indicate any one of the following: indicating that there is a paging message to be transmitted and/or there is no paging message to be transmitted on all the M POs; indicating that there is no paging message to be transmitted on all the M POs, and/or there is a paging message to be transmitted on at least one of the M POs; respectively indicating that there is a paging message to be transmitted and/or there is no paging message to be transmitted on each of the M POs.

According to the method performed by the UE provided by the disclosure, a value of the M is any one of the following: a predefined value; a preconfigured value; a total number of POs corresponding to one paging frame PF; a total number of POs corresponding to multiple predefined or preconfigured PFs; a total number of POs in a time window with a predefined length or a preconfigured length; a total number of POs in one synchronization signal block SSB cycle; a total number of POs in multiple predefined or preconfigured SSB cycles.

According to the method performed by the UE provided by the disclosure, a time domain location of the indication information is associated with at least one of the following: a time domain location of a synchronization signal block SSB, or a time domain location of the PO, wherein indication information of S beam directions is transmitted by a base station by way of beam sweeping, the S is a number of SSBs actually transmitted in one SSB cycle, and indication information of a K-th beam direction corresponds to a same beam direction as a K-th SSB actually transmitted in one SSB cycle, K=1, 2, . . . S.

According to the method performed by the UE provided by the disclosure, the time domain location of the indication information being associated with the time domain location of the SSB comprises at least one of the following: a start location of the indication information of the K-th beam direction is a location with a first interval apart and after an end location of the K-th SSB actually transmitted in one SSB cycle; or a start location of indication information of a last beam direction is a location with a second interval apart and after an end location of a last SSB actually transmitted in one SSB cycle, and locations of indication information of other beam directions except the indication information of the last beam direction among the indication information of the S beam directions are determined by the location of the indication information of the last beam direction; or a start location of indication information of a first beam direction is a location with a third interval apart and after the end location of the last SSB actually transmitted in one SSB cycle, and locations of indication information of other beam directions except the indication information of the first beam direction among the indication information of the S beam directions are determine by the location of the indication information of the first beam direction; or the start location of the indication information of the last beam direction is a location with a fifteenth interval apart and before a start location of a first SSB actually transmitted in one SSB cycle, and locations of indication information of other beam directions except the indication information of the first beam direction among the indication information of the S beam directions are determined by the location of the indication information of the first beam direction; or the start location of the indication information of the first beam direction is a location with a sixteenth interval apart and before the start location of the first SSB actually transmitted in one SSB cycle, and the locations of the indication information of other beam directions except the indication information of the first beam direction among the S beam directions are determined by the location of the indication information of the first beam direction; wherein the first interval, the second interval, the third interval, the fifteenth interval and the sixteenth interval are predefined or preconfigured values or values reported by the UE to the base station.

According to the method performed by the UE provided by the disclosure, the time domain locations of the indication information include a plurality of candidate time domain locations within a time window, and the time domain location of the indication information being associated with the time domain location of the SSB comprises at least one of the following: a start location of the time window of the indication information is a location with a fourth interval apart and after an end location of a last SSB actually transmitted in one SSB cycle, and a length of the time window is predefined or preconfigured; or an end location of the time window of the indication information is a location with a fifth interval apart and after the end location of the last SSB actually transmitted in one SSB cycle, and the start location of the time window of the indication information is a location with a sixth interval apart and after the end location of the last SSB actually transmitted in one SSB cycle; wherein the fourth interval, the fifth interval and the sixth interval are predefined or preconfigured values or values reported by the UE to the base station.

According to the method performed by the UE provided by the disclosure, the first interval, the second interval, the third interval, the fourth interval and the sixth interval contain at least one of processing time for receiving SSB and preparation time for receiving indication information by the UE, and the fifth interval contains at least one of processing time for receiving SSB, preparation time for receiving indication information by the UE and complete duration time of indication information transmission.

According to the method performed by the UE provided by the disclosure, the SSB for determining the time domain location of the indication information is a latest SSB actually transmitted with at least a seventh interval apart and before a start location of the first PO among the M POs indicated by the indication information, wherein the seventh interval is a predefined or preconfigured value or a value reported by the UE to the base station.

According to the method performed by the UE provided by the disclosure, the seventh interval includes the processing time for receiving the SSB and/or the preparation time for receiving POs by the UE.

According to the method performed by the UE provided by the disclosure, the time domain location of the indication information being associated with the time domain location of the PO comprises at least one of the following: an end location of indication information of a last beam direction is a location with an eighth interval apart and before a start location of a first PO among the M POs indicated by the indication information, and locations of indication information of other beam directions except indication information of a last beam direction among the indication information of the S beam directions are determined by the location of the indication information of the last beam direction; or an end location of indication information of a first beam direction is a location with a ninth interval apart and before the start location of the first PO among the M POs indicated by the indication information, and locations of indication information of other beam directions except the indication information of the first beam direction among the indication information of the S beam directions are determined by the location of the indication information of the first beam direction; or an end location of the indication information of the K-th beam direction is a location with a tenth interval apart and before a start location of a specific physical downlink control channel (PDCCH) monitoring occasion of the first PO among the M POs indicated by the indication information, and the specific PDCCH monitoring occasion is a PDCCH monitoring occasion corresponding to the K-th SSB actually transmitted in one SSB cycle, wherein the eighth interval, the ninth interval and the tenth interval are predefined or preconfigured values or values reported by the UE to the base station.

According to the method performed by the UE provided by the disclosure, the time domain locations of the indication information include a plurality of candidate time domain locations within a time window, and the time domain location of the indication information being associated with the time domain location of the PO comprises at least one of the following: an end location of the time window of the indication information is a location with an eleventh interval apart and before a start location of a first PO among the M POs indicated by the indication information, and a length of the time window is predefined or preconfigured; or a start location of the time window of the indication information is a location with a twelfth interval apart and before the start location of the first PO among M POs indicated by the indication information, and an end location of the time window of the indication information is a location with a thirteenth interval apart and before the start location of the first PO among a plurality of POs indicated by the indication information; wherein the eleventh interval, the twelfth interval and the thirteenth interval are predefined or preconfigured values or values reported by the UE to the base station.

According to the method performed by the UE provided by the disclosure, the eighth interval, the ninth interval, the tenth interval, the eleventh interval and the thirteenth interval include at least one of processing time for receiving indication information and preparation time for receiving POs by the UE, and the twelfth interval includes at least one of processing time for receiving indication information, preparation time for receiving POs by the UE and complete duration time of indication information transmission.

According to the method performed by the UE provided by the disclosure, the indication information is carried by downlink control information DCI, wherein the DCI includes at least one of the following: M-bit bitmap information for respectively indicating whether there is a paging message to be transmitted on each of the M POs; or a short message for indicating a paging message on a radio access network side.

According to the method performed by the UE provided by the disclosure, the DCI carrying the indication information scrambles cyclic redundancy check CRC with a same radio network temporary identifier RNTI value as a physical downlink control channel PDCCH used for scheduling paging messages, or scrambles the CRC with a whole network fixed RNTI value different from that of the PDCCH used for scheduling paging messages.

According to the method performed by the UE provided by the disclosure, the DCI carrying the indication information uses a same search space as a physical downlink control channel PDCCH used for scheduling paging messages, or uses a preconfigured dedicated search space.

According to the method performed by the UE provided by the disclosure, the method further comprises: if the UE does not monitor the indication information, the UE performs a predefined or preconfigured action, wherein the predefined or preconfigured action includes at least one of the following: skipping a PO corresponding to the UE among the M POs; or monitoring the PO corresponding to the UE among the M POs.

According to the method performed by the UE provided by the disclosure, the indication information is carried by M predefined or preconfigured physical layer sequence signals, and each physical layer sequence signal corresponds to one of the M POs.

According to the method performed by the UE provided by the disclosure, the M physical layer sequence signals are multiplexed by time division multiplexing, or by frequency division multiplexing, or by code division multiplexing, or by single sequence code division multiplexing, or by a mixed way of time division multiplexing, frequency division multiplexing, code division multiplexing and single sequence code division multiplexing.

According to the method performed by the UE provided by the disclosure, the single sequence code division multiplexing refers that the base station transmits at most one physical layer sequence signal on one indication information time-frequency resource.

According to the method performed by the UE provided by the disclosure, a plurality of UEs monitoring a same PO are divided into N UE groups, and the indication information is used to indicate whether there is a paging message to be transmitted to the N UE groups on the M POs, respectively.

According to the method performed by the UE provided by the disclosure, the indication information is carried by M*N predefined or preconfigured physical layer sequence signals, and each physical layer sequence signal corresponds to one of the N UE groups and one of the M POs, respectively.

According to the method performed by the UE provided by the disclosure, the M*N physical layer sequence signals are multiplexed by time division multiplexing, or by frequency division multiplexing, or by code division multiplexing, or by single sequence code division multiplexing, or by a mixed way of time division multiplexing, frequency division multiplexing, code division multiplexing and single sequence code division multiplexing.

According to the method performed by the UE provided by the disclosure, the indication information is carried by the DCI, and the DCI includes any one of the following: N bit blocks with the size of M bits, each bit block indicates whether there is a paging message to be transmitted to one UE group on each of the M POs in the form of a bitmap; or M bit blocks with the size of N bits, each bit block respectively indicates whether there is a paging message to be transmitted to the N UE groups on one of the M POs in a bitmap form.

According to the method performed by the UE provided by the disclosure, the indication information includes N pieces of independent indication information, each piece of indication information is used to indicate whether there is a paging message to be transmitted to one UE group on the M POs, and the N pieces of indication information are multiplexed by a time division multiplexing and/or a frequency division multiplexing.

According to the method performed by the UE provided by the disclosure, the indication information includes M pieces of independent indication information, each piece of indication information is used to indicate whether there is paging message to be transmitted to N UE groups on one of the M POs, and the M pieces of indication information are multiplexed by time division multiplexing and/or a frequency division multiplexing.

According to the method performed by the UE provided by the disclosure, the M or N pieces of indication information are time-division multiplexed by at least one of the following ways: transmission of each piece of indication information on different beam directions is consecutive in time; or transmission of different pieces of indication information on a same beam direction is consecutive in time.

According to an aspect of the disclosure, there is provided a method performed by a base station comprising: transmitting indication information to UE, wherein the indication information is used to indicate whether there is a paging message to be transmitted on M POs in one paging cycle, and M>1.

According to the method performed by the base station provided by the disclosure, the M POs are consecutive.

According to the method performed by the base station provided by the disclosure, the indication information is used to indicate any one of the following: indicating that there is a paging message to be transmitted and/or there is no paging message to be transmitted on all the M POs; indicating that there is no paging message to be transmitted on all the M POs, and/or there is a paging message to be transmitted on at least one of the M POs; respectively indicating that there is a paging message to be transmitted and/or there is no paging message to be transmitted on each of the M POs.

According to the method performed by the base station provided by the disclosure, a value of the M is any one of the following: a predefined value; a preconfigured value; a total number of POs corresponding to one paging frame PF; a total number of POs corresponding to multiple predefined or preconfigured PFs; a total number of POs in a time window with a predefined length or a preconfigured length;

a total number of POs in one synchronization signal block SSB cycle; a total number of POs in multiple predefined or preconfigured SSB cycles.

According to the method performed by the base station provided by the disclosure, a time domain location of the indication information is associated with at least one of the following: a time domain location of a synchronization signal block SSB, or a time domain location of the PO, wherein indication information of S beam directions is transmitted by a base station by way of beam sweeping, the S is a number of SSBs actually transmitted in one SSB cycle, and indication information of a K-th beam direction corresponds to a same beam direction as a K-th SSB actually transmitted in one SSB cycle, K=1, 2, . . . S.

According to the method performed by the base station provided by the disclosure, the time domain location of the indication information being associated with the time domain location of the SSB comprises at least one of the following: a start location of the indication information of the K-th beam direction is a location with a first interval apart and after an end location of the K-th SSB actually transmitted in one SSB cycle; or a start location of indication information of a last beam direction is a location with a second interval apart and after an end location of a last SSB actually transmitted in one SSB cycle, and locations of indication information of other beam directions except the indication information of the last beam direction among the indication information of the S beam directions are determined by the location of the indication information of the last beam direction; or a start location of indication information of a first beam direction is a location with a third interval apart and after the end location of the last SSB actually transmitted in one SSB cycle, and locations of indication information of other beam directions except the indication information of the first beam direction among the indication information of the S beam directions are determine by the location of the indication information of the first beam direction; or the start location of the indication information of the last beam direction is a location with a fifteenth interval apart and before a start location of a first SSB actually transmitted in one SSB cycle, and locations of indication information of other beam directions except the indication information of the first beam direction among the indication information of the S beam directions are determined by the location of the indication information of the first beam direction; or the start location of the indication information of the first beam direction is a location with a sixteenth interval apart and before the start location of the first SSB actually transmitted in one SSB cycle, and the locations of the indication information of other beam directions except the indication information of the first beam direction among the S beam directions are determined by the location of the indication information of the first beam direction; wherein the first interval, the second interval, the third interval, the fifteenth interval and the sixteenth interval are predefined or preconfigured values or values reported by the UE to the base station.

According to the method performed by the base station provided by the disclosure, the time domain locations of the indication information include a plurality of candidate time domain locations within a time window, and the time domain location of the indication information being associated with the time domain location of the SSB comprises at least one of the following: a start location of the time window of the indication information is a location with a fourth interval apart and after an end location of a last SSB actually transmitted in one SSB cycle, and a length of the time window is predefined or preconfigured; or an end location of the time window of the indication information is a location with a fifth interval apart and after the end location of the last SSB actually transmitted in one SSB cycle, and the start location of the time window of the indication information is a location with a sixth interval apart and after the end location of the last SSB actually transmitted in one SSB cycle; wherein the fourth interval, the fifth interval and the sixth interval are predefined or preconfigured values or values reported by the UE to the base station.

According to the method performed by base station provided by the disclosure, the first interval, the second interval, the third interval, the fourth interval and the sixth interval contain at least one of processing time for receiving the SSB and preparation time for receiving indication information by the UE, and the fifth interval contains at least one of processing time for receiving the SSB, preparation time for receiving indication information by the UE and complete duration time of indication information transmission.

According to the method performed by the base station provided by the disclosure, the SSB for determining the time domain location of the indication information is a latest SSB actually transmitted with at least a seventh interval apart and before a start location of the first PO among the M POs indicated by the indication information, wherein the seventh interval is a predefined or preconfigured value or a value reported by the UE to the base station.

According to the method performed by the base station provided by the disclosure, the seventh interval includes the processing time for receiving the SSB and/or the preparation time for receiving POs by the UE.

According to the method performed by the base station provided by the disclosure, the time domain location of the indication information being associated with the time domain location of the PO comprises at least one of the following: an end location of indication information of a last beam direction is a location with an eighth interval apart and before a start location of a first PO among the M POs indicated by the indication information, and locations of indication information of other beam directions except indication information of a last beam direction among the indication information of the S beam directions are determined by the location of the indication information of the last beam direction; or an end location of indication information of a first beam direction is a location with a ninth interval apart and before the start location of the first PO among the M POs indicated by the indication information, and locations of indication information of other beam directions except the indication information of the first beam direction among the indication information of the S beam directions are determined by the location of the indication information of the first beam direction; or an end location of the indication information of the K-th beam direction is a location with a tenth interval apart and before a start location of a specific physical downlink control channel (PDCCH) monitoring occasion of the first PO among the M POs indicated by the indication information, and the specific PDCCH monitoring occasion is a PDCCH monitoring occasion corresponding to the K-th SSB actually transmitted in one SSB cycle, wherein the eighth interval, the ninth interval and the tenth interval are predefined or preconfigured values or values reported by the UE to the base station.

According to the method performed by the base station provided by the disclosure, the time domain locations of the indication information include a plurality of candidate time domain locations within a time window, and the time domain location of the indication information being associated with the time domain location of the PO comprises at least one of the following: an end location of the time window of the indication information is a location with an eleventh interval apart and before a start location of a first PO among the M POs indicated by the indication information, and a length of the time window is predefined or preconfigured; or a start location of the time window of the indication information is a location with a twelfth interval apart and before the start location of the first PO among M POs indicated by the indication information, and an end location of the time window of the indication information is a location with a thirteenth interval apart and before the start location of the first PO among a plurality of POs indicated by the indication information; wherein the eleventh interval, the twelfth interval and the thirteenth interval are predefined or preconfigured values or values reported by the UE to the base station.

According to the method performed by the base station provided by the disclosure, the eighth interval, the ninth interval, the tenth interval, the eleventh interval and the thirteenth interval include at least one of processing time for receiving indication information and preparation time for receiving POs by the UE, and the twelfth interval includes at least one of processing time for receiving indication information, preparation time for receiving POs by the UE and complete duration time of indication information transmission.

According to the method performed by the base station provided by the disclosure, the indication information is carried by downlink control information DCI, wherein the DCI includes at least one of the following: M-bit bitmap information for respectively indicating whether there is a paging message to be transmitted on each of the M POs; or a short message for indicating a paging message on a radio access network side.

According to the method performed by the base station provided by the disclosure, the DCI carrying the indication information scrambles cyclic redundancy check CRC with a same radio network temporary identifier RNTI value as a physical downlink control channel PDCCH used for scheduling paging messages, or scrambles the CRC with a whole network fixed RNTI value different from that of the PDCCH used for scheduling paging messages.

According to the method performed by the base station provided by the disclosure, the DCI carrying the indication information uses a same search space as a physical downlink control channel PDCCH used for scheduling paging messages, or uses a preconfigured dedicated search space.

According to the method performed by the base station provided by the disclosure, the method further comprises: if the UE does not monitor the indication information, the UE performs a predefined or preconfigured action, wherein the predefined or preconfigured action includes at least one of the following: skipping a PO corresponding to the UE among the M POs; or monitoring the PO corresponding to the UE among the M POs.

According to the method performed by the base station provided by the disclosure, the indication information is carried by M predefined or preconfigured physical layer sequence signals, and each physical layer sequence signal corresponds to one of the M POs.

According to the method performed by the base station provided by the disclosure, the M physical layer sequence signals are multiplexed by time division multiplexing, or by frequency division multiplexing, or by code division multiplexing, or by single sequence code division multiplexing, or by a mixed way of time division multiplexing, frequency division multiplexing, code division multiplexing and single sequence code division multiplexing.

According to the method performed by the base station provided by the disclosure, the single sequence code division multiplexing refers that the base station transmits at most one physical layer sequence signal on one indication information time-frequency resource.

According to the method performed by the base station provided by the disclosure, a plurality of UEs monitoring a same PO are divided into N UE groups, and the indication information is used to indicate whether there is a paging message to be transmitted to the N UE groups on the M POs, respectively.

According to the method performed by the base station provided by the disclosure, the indication information is carried by M*N predefined or preconfigured physical layer sequence signals, and each physical layer sequence signal corresponds to one of the N UE groups and one of the M POs, respectively.

According to the method performed by the base station provided by the disclosure, the M*N physical layer sequence signals are multiplexed by time division multiplexing, or by frequency division multiplexing, or by code division multiplexing, or by single sequence code division multiplexing, or by a mixed way of time division multiplexing, frequency division multiplexing, code division multiplexing and single sequence code division multiplexing.

According to the method performed by the base station provided by the disclosure, the indication information is carried by DCI, and the DCI includes any one of the following: N bit blocks with the size of M bits, each bit block indicates whether there is a paging message to be transmitted to one UE group on each of the M POs in the form of a bitmap; or M bit blocks with the size of N bits, each bit block respectively indicates whether there is a paging message to be transmitted to the N UE groups on one of the M POs in a bitmap form.

According to the method performed by the base station provided by the disclosure, the indication information includes N pieces of independent indication information, each piece of indication information is used to indicate whether there is a paging message to be transmitted to one UE group on the M POs, and the N pieces of indication information are multiplexed by a time division multiplexing and/or a frequency division multiplexing.

According to the method performed by the base station provided by the disclosure, the indication information includes M pieces of independent indication information, each piece of indication information is used to indicate whether there is paging message to be transmitted to N UE groups on one of the M POs, and the M pieces of indication information are multiplexed by time division multiplexing and/or a frequency division multiplexing.

According to the method performed by the base station provided by the disclosure, the M or N pieces of indication information are time-division multiplexed by at least one of the following ways: transmission of each piece of indication information on different beam directions is consecutive in time; or transmission of different pieces of indication information on a same beam direction is consecutive in time.

According to an aspect of the disclosure, there is provided a user equipment comprising a transceiver configured to transmit and receive signals with the outside; and a processor configured to control the transceiver to perform a method according to the above methods performed by the user equipment.

According to another aspect of the disclosure, there is provided a base station comprising a transceiver configured to transmit and receive signals with the outside; and a processor configured to control the transceiver to perform the above methods performed by the base station.

In several embodiments provided in this application, it should be understood that the disclosed apparatus and method can also be implemented in other ways. The apparatus embodiments described above are merely illustrative, for example, the flowcharts and block diagrams in the drawings show the architecture, functions and operations of possible implementations of apparatuses, methods and computer program products according to various embodiments of the disclosure. In this regard, each block in the flowchart or block diagram may represent a module, program segment or part of code including one or more executable instructions for implementing specified logical functions. It should also be noted that in some alternative implementations, the functions marked in the blocks may also occur in a different order from those marked in the drawings. For example, two consecutive blocks can actually be performed in substantially parallel, and sometimes they can be performed in reverse order, depending on the functions involved. It should also be noted that each block in the block diagrams and/or flowcharts, and combinations of blocks in the block diagrams and/or flowcharts, can be implemented with dedicated hardware-based systems that perform specified functions or actions, or can be implemented with combinations of dedicated hardware and computer instructions.

Various embodiments of the disclosure may be implemented as computer readable code embodied on a computer readable recording medium from a specific perspective. A computer-readable recording medium can be any data storage device that can store data readable by a computer system. Examples of the computer-readable recording medium may include read-only memory (ROM), random access memory (RAM), compact disk read-only memory (CD-ROM), magnetic tape, floppy disk, optical data storage device, carrier wave (e.g., data transmission via the Internet), and the like. Computer readable recording media can be distributed by computer systems connected via a network, and thus computer readable codes can be stored and performed in a distributed manner. Furthermore, functional programs, codes, and code segments for implementing various embodiments of the disclosure can be easily explained by those skilled in the art to which the embodiments of the disclosure are applied.

It will be understood that embodiments of the disclosure may be implemented in hardware, software, or a combination of hardware and software. Software may be stored as program instructions or computer readable code executable on a processor on a non-transitory computer readable medium. Examples of non-transitory computer-readable recording media include magnetic storage media (e.g., ROM, floppy disk, hard disk, etc.) and optical recording media (e.g., CD-ROM, digital video disk (DVD), etc.). Non-transient computer-readable recording media can also be distributed on computer systems coupled by networks, so that computer-readable codes can be stored and performed in a distributed manner. The medium can be read by a computer, stored in a memory, and performed by a processor. The various embodiments may be implemented by a computer or a portable terminal including a controller and a memory, and the memory may be an example of a non-transitory computer readable recording medium suitable for storing program (s) having instructions to implement the embodiments of the disclosure. The disclosure can be realized by a program having code for concretely implementing the apparatus and method described in the claims, which is stored in a machine (or computer) readable storage medium. The program can be electronically carried on any medium, such as a communication signal transmitted via a wired or wireless connection, and the disclosure suitably includes equivalents thereof.

The above description is only the specific implementation of this disclosure, but the protection scope of this disclosure is not limited to this. Any person familiar with this technical field can make various changes or substitutions within the technical scope disclosed in this disclosure, and these changes or substitutions should be covered within the protection scope of this disclosure. Therefore, the protection scope of this disclosure shall be subject to the protection scope of the claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a communication system, the method comprising:
receiving a configuration of a paging early indication (PEI), wherein the configuration includes information on a number of paging occasions (POs);
receiving, based on the configuration, downlink control information (DCI) including an indication field associated with the PEI, wherein a bit in the indication field indicates a UE subgroup of a PO; and
in case that a value of the bit in the indication field is 1, monitoring the PO corresponding to the bit associated with the UE subgroup to which the UE belongs,
wherein the UE subgroup to which the UE belongs is one of N UE subgroups corresponding to the PO, and
the indication field corresponds to M segments of N bits where M is the number of POs.

2. The method of claim 1, further comprising in case that the value of the bit in the indication field is 0, determining not to monitor the PO corresponding to the bit associated with the UE subgroup to which the UE belongs,
wherein a cyclic redundancy check (CRC) of the DCI is scrambled with a PEI-radio network temporary identifier (RNTI).

3. The method of claim 1, wherein a time location for monitoring the DCI is identified based on a time interval from a starting location associated with a 1st PO among the POs.

4. A user equipment (UE) in a communication system, the UE comprising:
a transceiver; and
a processor coupled with the transceiver and configured to:
receive a configuration of a paging early indication (PEI), wherein the configuration includes information on a number of paging occasions (POs);
receive, based on the configuration, downlink control information (DCI) including an indication field associated with the PEI, wherein a bit in the indication field indicates a UE subgroup of a PO; and
in case that a value of the bit in the indication field is 1, monitor the PO corresponding to the bit associated with the UE subgroup to which the UE belongs,
wherein the UE subgroup to which the UE belongs is one of N UE subgroups corresponding to the PO, and the indication field corresponds to M segments of N bits where M is the number of POs.

5. The UE of claim 4, wherein the processor is further configured to:
in case that the value of the bit in the indication field is 0, determine not to monitor the PO corresponding to the bit associated with the UE subgroup to which the UE belongs, and
wherein a cyclic redundancy check (CRC) of the DCI is scrambled with a PEI-radio network temporary identifier (RNTI).

6. The UE of claim 4, wherein a time location for monitoring the DCI is identified based on a time interval from a starting location associated with a 1st PO among the POs.

7. A method performed by a base station in a communication system, the method comprising:
determining a configuration of a paging early indication (PEI), wherein the configuration includes information on a number of paging occasions (POs);
transmitting, to a user equipment (UE), the configuration;
determining downlink control information (DCI) including an indication field associated with the PEI, wherein a bit in the indication field indicates a UE subgroup of a PO; and
transmitting, to the UE, the DCI,
wherein in case that a value of the bit corresponding to the PO is 1, the PO corresponding to the bit associated with the UE subgroup to which the UE belongs is indicated to be monitored,
wherein the UE subgroup to which the UE belongs is one of N UE subgroups corresponding to the PO, and
the indication field corresponds to M segments of N bits where M is the number of POs.

8. The method of claim 7, wherein in case that the value of the bit corresponding to the PO is 0, the PO corresponding to the bit associated with the UE subgroup to which the UE belongs is indicated not to be monitored, and wherein a cyclic redundancy check (CRC) of the DCI is scrambled with a PEI-radio network temporary identifier (RNTI).

9. The method of claim 7, wherein a time location for transmission of the DCI is based on a time interval from a starting location associated with a 1st PO among the POs.

10. A base station in a communication system, the base station comprising:
a transceiver; and
a processor coupled with the transceiver and configured to:
determine a configuration of a paging early indication (PEI), wherein the configuration includes information on a number of paging occasions (POs);
transmit, to a user equipment (UE), the configuration;
determine downlink control information (DCI) including an indication field associated with the PEI, wherein a bit in the indication field indicates a UE subgroup of a PO; and
transmit, to the UE, the DCI,
wherein in case that a value of the bit corresponding to the PO is 1, the PO corresponding to the bit associated with the UE subgroup to which the UE belongs is indicated to be monitored,
wherein the UE subgroup to which the UE belongs is one of N UE subgroups corresponding to the PO, and
the indication field corresponds to M segments of N bits where M is the number of POs.

11. The base station of claim 10, wherein in case that the value of the bit corresponding to the PO is 0, the PO corresponding to the bit associated with the UE subgroup to which the UE belongs is indicated not to be monitored, and
wherein a cyclic redundancy check (CRC) of the DCI is scrambled with a PEI-radio network temporary identifier (RNTI).

12. The base station of claim 10, wherein a time location for transmission of the DCI is based on a time interval from a starting location associated with a 1st PO among the POs.

* * * * *